United States Patent
Zhu et al.

(10) Patent No.: US 11,528,591 B2
(45) Date of Patent: Dec. 13, 2022

(54) NETWORK SLICING-BASED COMMUNICATION METHOD AND NETWORK SLICING-BASED COMMUNICATIONS APPARATUS

(71) Applicant: HUAWEI TECHNOLOGIES CO., LTD., Guangdong (CN)

(72) Inventors: Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 17/010,101

(22) Filed: Sep. 2, 2020

(65) Prior Publication Data
US 2020/0404480 A1     Dec. 24, 2020

Related U.S. Application Data

(63) Continuation of application No. PCT/CN2019/077133, filed on Mar. 6, 2019.

(30) Foreign Application Priority Data

Mar. 14, 2018 (CN) .......................... 201810207671.3

(51) Int. Cl.
*H04W 8/06* (2009.01)
*H04W 60/00* (2009.01)

(52) U.S. Cl.
CPC ........... *H04W 8/065* (2013.01); *H04W 60/00* (2013.01)

(58) Field of Classification Search
CPC ..... H04W 8/065; H04W 60/00; H04W 48/12; H04L 41/0893; H04L 41/5041
See application file for complete search history.

(56) References Cited

U.S. PATENT DOCUMENTS

2017/0359768 A1    12/2017  Byun et al.
2020/0228968 A1*   7/2020   Bernardos ............. H04W 48/18
(Continued)

FOREIGN PATENT DOCUMENTS

CN    106982458 A    7/2017
CN    107113195 A    8/2017
(Continued)

OTHER PUBLICATIONS

Ericsson, "Assistance information for network slice selection in RRC," 3GPP TSG-RAN WG3 AH #2, Tdoc R3-172509, Qingdao, P. R. China, Jun. 27-29, 2017, 4 pages.
(Continued)

*Primary Examiner* — Mazda Sabouri
(74) *Attorney, Agent, or Firm* — Fish & Richardson P.C.

(57) ABSTRACT

This application provides example network slicing-based communication methods and apparatuses. One example method includes receiving, by a radio access network device, a registration request from user equipment, where the registration request includes first information and second information, where the first information is used to indicate a type of a first network slice, and where the second information is used to identify a first network slice instance in the first network slice. The radio access network device can then determine an access and mobility management function network element based on the type of the first network slice and the first network slice instance. The radio access network device can then send the registration request to the access and mobility management function network element, where the first information and the second information are used for network slice instance determining.

14 Claims, 10 Drawing Sheets

(56) References Cited

U.S. PATENT DOCUMENTS

2021/0289351 A1* 9/2021 Ferdi ............... H04W 12/02
2021/0337380 A1* 10/2021 Ianev ............... H04W 60/04

FOREIGN PATENT DOCUMENTS

| CN | 107395388 A | 11/2017 |
|---|---|---|
| CN | 107580360 A | 1/2018 |
| WO | 2017080517 A1 | 5/2017 |
| WO | 2017206373 A1 | 12/2017 |
| WO | 2018034924 A1 | 2/2018 |

OTHER PUBLICATIONS

3GPP TS 23.501 V15.0 0 (Dec. 2017), "3rd Generation Partnership Project;Technical Specification Group Services and System Aspects;System Architecture for the 5G System;Stage 2(Release 15)," Dec. 2017, 181 pages.

Ericsson, "Discussion on Temp ID and NSSAI duplication," 3GPP TSG-RAN WG3#97, Tdoc R3-173208, Berlin, Germany, Aug. 21-25, 2017, 3 pages.

3GPP TS 23.502 V15.0 0 (Dec. 2017), 3rd Generation Partnership Project;Technical Specification Group Services and System Aspects;Procedures for the 5G System; Stage 2(Release 15), Dec. 2017, 257 pages.

Huawei, "Add usecase and requirements for management suppod slice selection," 3GPP TSG SA WG5 (Telecom Management) Meeting #111, S5-171122, Porto (Portugal), Jan. 16-20, 2017, 7 pages.

PCT International Search Report and Written Opinion issued in International Application No. PCT/CN2019/077133 dated May 29, 2019, 16 pages (with English translation).

Office Action issued in Indian Application No. 202037034835 dated Sep. 10, 2021, 7 pages.

Huawei, HiSilicon, "Ol#4h: TS 23.501: Selection of a Target AMF supporting the Network Slices due to UE mobility," SA WG2 Meeting #124 , S2-178399, Reno, Nevada, USA, Nov. 27-Dec. 1, 2017, 6 pages.

Office Action issued in Chinese Application No. 201810207671.3 dated Oct. 22, 2021, 4 pages.

Zte et al., "Proposed architecture alignments of Network Slicing Conclusion with 5G Core Overall Architecture in TS 23.501," SA WG2 Meeting #119, S2-171027, Feb. 13-17, 2017, Dubrovnik, Croatia, 7 pages.

Extended European Search Report in European Application No. 19768299.0, dated Jun. 30, 2021, pp. 14.

SA WG2, "LS to SA WG3 on privacy of registration and slice selection information," Meeting #S2-118BIS, S2-170687, Spokane, Washington, Jan. 16-20, 2017, 2 pages.

SA3, "Reply LS on privacy of registration and slice selection information," 3GPP TSG-SA WG3 Meeting #86Bis, Tdoc S3-170902, Busan, Korea, Mar. 27-31, 2017, 2 pages.

Office Action and Search Report in Chinese application No. 201810207671.3, dated Mar. 3, 2021, 17 pages.

* cited by examiner

NETWORK SLICING-BASED COMMUNICATION METHOD AND NETWORK SLICING-BASED COMMUNICATIONS APPARATUS

CROSS-REFERENCE TO RELATED APPLICATIONS

This application is a continuation of International Application No. PCT/CN2019/077133, filed on Mar. 6, 2019, which claims priority to Chinese Patent Application No. 201810207671.3, filed on Mar. 14, 2018. The disclosures of the aforementioned applications are hereby incorporated by reference in their entireties.

TECHNICAL FIELD

The present invention relates to the field of communications technologies, and in particular, to a network slicing-based communication method and a network slicing-based communications apparatus.

BACKGROUND

In the era of 5th-generation (5G) communications, hundreds of billions of internet of things devices access networks, and network requirements in different types of application scenarios are differentiated. In a network slicing technology, virtualized independent logical networks are created on a same network infrastructure to provide isolated network environments for different application scenarios, so that network functions and features can be customized based on requirements in the different application scenarios, thereby meeting requirements of different services.

Because user equipment has different requirements on a rate, a capacity, a coverage ratio, a delay, reliability, security, and bandwidth, different network slice types are required. Different network slice types may be identified by using network slice identification information. For example, the network slice identification information is single network slice selection assistance information (S-NSSAI).

To meet different service requirements, an operator may deploy different network slice instances (NSI) in a network slice to provide different services for user equipment. For example, in a core network, two network slice instances NSI-1 and NSI-2 are deployed in a network slice whose network slice identification information is S-NSSAI-1. A user accessing NSI-1 may use a service of the network slice identified by S-NSSAI-1 free of charge, but a user accessing NSI-2 needs to pay for using the service of the network slice identified by S-NSSAI-1. In this way, the operator may implement some function optimization or charging differentiation for different network slice instances.

Currently, when user equipment needs to access a network slice, the user equipment provides, to a core network, identification information of a network slice required by the user equipment. The core network determines, based on the identification information, a network slice meeting a network slice type, and selects a network slice instance deployed in the network slice to provide a service for the user equipment. After moving, the user equipment needs to access a new network slice instance. According to the solution in the prior art, a network slice instance selected by the user equipment based on the network slice identification information meets only the network slice type required by the user equipment, and a network slice instance after the user equipment moves may be different from the network slice instance before the user equipment moves. Consequently, a session of the user before the user moves cannot be maintained, and user experience deteriorates.

For example, FIG. 1 shows a scenario in which user equipment selects network slice instances before and after moving, where the user equipment is located within coverage of a radio access network (RAN) RAN-1 before moving, and in a core network, two network slice instances NSI-1 and NSI-2 are deployed in a network slice whose network slice identification information is S-NSSAI-1. The user equipment accesses the network slice instance NSI-1, and establishes a session by using a network element in NSI-1. When the user equipment moves to a coverage area of a radio access network RAN-2, in the core network, two network slice instances NSI-1 and NSI-3 are deployed in a network slice whose network slice identification information is S-NSSAI-1. The core network determines, based on network slice identification information provided by the user equipment, the network slice whose network slice identification information is S-NSSAI-1, and then selects the network slice instance NSI-3 to provide a service for the user equipment. Because a network element providing a session service in the network slice instance NSI-3 is different from that in NSI-1, the session before the user equipment moves cannot be maintained.

SUMMARY

Embodiments of the present invention provide a network slicing-based communication method and a network slicing-based communications apparatus.

According to an aspect, an embodiment of this application provides a network slicing-based communication method, and the method includes:

receiving, by a radio access network device (for example, a RAN device), a registration request from user equipment, where the registration request includes first information and second information, the first information is used to indicate a type of a first network slice (for example, first S-NSSAI), and the second information is used to identify a first network slice instance (for example, a first NSI) in the first network slice; determining, by the radio access network device, an access and mobility management function network element (for example, an AMF network element) based on the type of the first network slice and the first network slice instance; and sending, by the radio access network device, the registration request to the access and mobility management function network element, where the first information and the second information are used for network slice instance determining.

According to the foregoing method, the radio access network device can select the access and mobility management function network element that supports the type of the first network slice and the first network slice instance to serve the user equipment. The access and mobility management function network element further determines, based on a requirement of the user equipment, a network slice instance that can serve the user equipment. When the user equipment moves, the user equipment may learn of a network slice instance that serves the user equipment before the movement. After the movement, the user equipment requests the same network slice instance from the core network, to ensure that a session established before the user equipment moves is not interrupted, thereby improving user experience.

In a possible design, the method further includes: receiving, by the radio access network device, capability information from the access and mobility management function network element, where the capability information is used to indicate a network slice type and a network slice instance that are supported by the access and mobility management function network element. The determining, by the radio access network device, an access and mobility management function network element based on the type of the first network slice and the first network slice instance includes: determining, by the radio access network device, the access and mobility management function network element based on the type of the first network slice, the first network slice instance, and the capability information. In this way, the radio access network device can obtain the type of the network slice and the network slice instance that are supported by the access and mobility management function network element, and then select, based on the type of the first network slice and the first network slice instance that are requested by the user equipment, the access and mobility management function network element to serve the user equipment.

In a possible design, the determined access and mobility management function network element supports the type of the first network slice and the first network slice instance. Therefore, assuming that the user equipment accesses the first network slice instance in the first network slice before moving, after the user equipment moves, the radio access network device can select the access and mobility management function network element that supports the type of the first network slice and the first network slice instance to serve the user.

According to another aspect, this application further discloses a network slicing-based communication method, and the method includes:

receiving, by an access and mobility management function network element, a registration request from a radio access network device, where the registration request includes first information and second information, the first information is used to indicate a type of a first network slice, and the second information is used to identify a first network slice instance in the first network slice; and determining, by the access and mobility management function network element based on the first information and the second information, a network slice instance that is in the first network slice and that serves user equipment.

According to the foregoing method, the access and mobility management function network element may determine, based on a requirement of the user equipment, a network slice instance that can serve the user equipment. When the user equipment moves, the user equipment may learn of a network slice instance that serves the user equipment before the movement. After the movement, the user equipment requests the same network slice instance from the core network, to ensure that a session established before the user equipment moves is not interrupted, thereby improving user experience.

In a possible design, the method further includes: sending, by the access and mobility management function network element, capability information to the radio access network device, where the capability information is used to indicate the type of the first network slice and a network slice instance that is in the first network slice and that is supported by the access and mobility management function network element, and the capability information is used for determining the access and mobility management function network element. In this way, the radio access network device can obtain the type of the network slice and the network slice instance that are supported by the access and mobility management function network element, and then select, based on the type of the first network slice and the first network slice instance that are requested by the user equipment, the access and mobility management function network element to serve the user equipment.

In a possible design, the network slice instance that is in the first network slice and that serves the user equipment is the first network slice instance. In this way, after moving, the user equipment requests, from the core network, a network slice instance the same as that accessed by the user equipment before moving, to ensure that the session established before the user equipment moves is not interrupted, thereby improving user experience.

In a possible design, the determining, by the access and mobility management function network element based on the first information and the second information, a network slice instance that is in the first network slice and that serves user equipment includes: when the access and mobility management function network element does not support the first network slice instance identified by the second information, sending, by the access and mobility management function network element, the first information and indication information to a network slice selection function network element, where the indication information is used to request to determine a network slice instance that is in the first network slice and that serves the user equipment; and receiving, by the access and mobility management function network element from the network slice selection function network element, identification information of a second network slice instance that is in the first network slice and that is supported by the access and mobility management function network element. In this way, when the access and mobility management function network element serving the user equipment does not support the network slice instance requested by the user equipment, the core network may select a network slice instance supported by the access and mobility management function network element to serve the user equipment.

In a possible design, the method further includes: sending, by the access and mobility management function network element, the identification information of the second network slice instance to the user equipment. In this way, when the access and mobility management function network element serving the user equipment does not support the network slice instance requested by the user equipment, the core network sends, to the user equipment, information about the network slice instance selected to serve the user equipment, so that the user equipment requests the core network to select the same network slice instance to serve the user equipment after next movement. In this way, it can be ensured that the session currently established by the user equipment is not interrupted after the next movement, thereby improving user experience.

According to another aspect, this application further discloses a network slicing-based communication method, and the method includes:

obtaining, by user equipment, first information and second information, where the first information is used to indicate a type of a first network slice, and the second information is used to identify a first network slice instance in the first network slice; and sending, by the user equipment, a registration request to a radio access network device, where the registration request includes the first information and the second information, the first information and the second information are used for determining a first access and mobility management function network element, and the first information and the second information are further used for determining a network slice instance that is in the first network slice and that serves the user equipment.

According to the foregoing method, the user equipment can obtain information about a network slice instance that the user equipment accesses before moving. After the user equipment moves, the user equipment may request, from a core network, the same network slice instance to serve the user equipment, to ensure that a session established before the user equipment moves is not interrupted, thereby improving user experience.

In a possible design, the obtaining, by user equipment, first information and second information includes: receiving, by the user equipment, a registration accept message from a second access and mobility management function network element, where the registration accept message includes the first information and the second information, and the second access and mobility management function network element supports the type of the first network slice and the first network slice instance; receiving, by the user equipment, a session establishment accept message from a third access and mobility management function network element, where the session establishment accept message includes the first information and the second information, and the third access and mobility management function network element supports the type of the first network slice and the first network slice instance; or receiving, by the user equipment, the first information and the second information from an interworking network element, where the interworking network element supports a session management function of a first network and a session management function of a second network. In this way, the user equipment may obtain, in a registration process or a session establishment process, information about a network slice instance corresponding to S-NSSAI associated with the session. After the user equipment moves, the user equipment may request, from the core network, the same network slice instance to serve the user equipment, to ensure that the session established before the user equipment moves is not interrupted, thereby improving user experience. In addition, when the user equipment supports interworking between 4G and 5G, after creating PDN connectivity in a 4G network, the user equipment can obtain the information about the network slice instance corresponding to the S-NSSAI associated with the session. When the user equipment uses the 5G network, the user equipment may request, from the core network, the network slice instance associated with the current session to serve the user equipment, to ensure that the session established when the user equipment switches from the 4G network to the 5G network is not interrupted, thereby improving user experience.

According to another aspect, this application further discloses a network slicing-based communication method, and the method includes:

receiving, by a first access and mobility management function network element after receiving a registration request, first information and second information from a data management function network element, where the first information is used to indicate a type of a first network slice, and the second information is used to identify a first network slice instance in the first network slice; and when the first access and mobility management function network element does not support the first network slice instance identified by the second information, sending, by the first access and mobility management function network element, the first information, the second information, and indication information to a network slice selection function network element, where the indication information is used to request to determine a second access and mobility management function network element that supports the type of the first network slice and the first network slice instance.

According to the foregoing method, assuming that user equipment accesses the first network slice instance in the first network slice before moving, the user equipment stores the type of the first network slice and information about the first network slice instance in the data management function network element. After the user equipment moves, the first access and mobility management function network element requests the network slice selection function network element to select the second access and mobility management function network element that supports the first network slice type and the first network slice instance to serve the user equipment. Thereby, the second access and mobility management function network element can determine a network slice instance to serve the user equipment, to ensure that a session established before the user equipment moves is not interrupted, thereby improving user experience.

In a possible design, the method further includes: receiving, by the first access and mobility management function network element, identification information of the second access and mobility management function network element from the network slice selection function network element. Therefore, when an access and mobility management function network element that supports the first network slice type and the first network slice instance exists in a network, the first access and mobility management function network element can obtain an identifier of the access and mobility management function network element, to make the second access and mobility management function network element serve the user.

In a possible design, the method further includes: receiving, by the first access and mobility management function network element, identification information of a second network slice instance in the first network slice from the network slice selection function network element; and sending, by the first access and mobility management function network element, the identification information of the second network slice instance to the data management function network element. In this way, when there is no access and mobility management function network element that supports the first network slice type and the first network slice instance in the network, the core network may select the second access and mobility management function network element that supports the first network slice type to serve the user equipment, and requests the network slice selection function network element to determine a network slice instance supported by the second access and mobility management function network element to serve the user equipment. In addition, the data management function network element saves information about the network slice instance selected to serve the user equipment, so that after the user equipment moves next time, the core network can select the same network slice instance to serve the user equipment. In this way, it can be ensured that the session currently established by the user equipment is not interrupted after the next movement, thereby improving user experience.

According to another aspect, this application further discloses a network slicing-based communication method, and the method includes:

obtaining, by a data management function network element, first information and second information from a first access and mobility management function network element, where the first information is used to indicate a type of a network slice, the second information is used to identify a network slice instance in the network slice, and the first access and mobility management function network element supports the type of the network slice and the network slice instance; and sending, by the data management function network element, the first information and the second information to a second access and mobility management function network element, where the first information and the second information are used for determining a third access and mobility management function network element, and the third access and mobility management function network element supports the type of the network slice and the network slice instance.

According to the foregoing method, before the user equipment moves, a network slice instance serving the user equipment is stored in the data management function network element. After the user equipment moves, the core network can select a network slice instance that is the same as that before the movement to serve the user equipment. In this way, it is ensured that a session established before the user equipment moves is not interrupted, thereby improving user experience. In addition, the data management function network element stores the information about the network slice instance that is before the movement, so that the user equipment and a RAN device do not learn of the information about the network slice instance, thereby saving storage space of the user equipment.

According to another aspect, this application further discloses a network slicing-based communication method, and the method includes:

receiving, by a network slice selection function network element, first information, second information, and indication information from a first access and mobility management function network element, where the first information is used to indicate a type of a first network slice, the second information is used to identify a first network slice instance in the first network slice, and the indication information is used to request to determine a second access and mobility management function network element that supports the type of the first network slice and the first network slice instance; and determining, by the network slice selection function network element, whether the second access and mobility management function network element exists in an area in which user equipment is located.

According to the foregoing method, before moving, the user equipment stores, in a data management function network element, information about the type of the first network slice serving the user equipment and about the first network slice instance. After the user equipment moves, the network slice selection function network element receives the information about the type of the first network slice and about the first network slice instance from the first access and mobility management function network element. The network slice selection function network element determines whether the access and mobility management function network element supporting the type of the first network slice and the first network slice instance exists in the area in which the user equipment is located, to select an appropriate access and mobility management function network element to serve the user equipment.

In a possible design, the method further includes: when the second access and mobility management function network element exists in the area in which the user equipment is located, sending, by the network slice selection function network element, identification information of the second access and mobility management function network element to the first access and mobility management function network element. Therefore, when an access and mobility management function network element that supports the first network slice type and the first network slice instance exists in a network, the first access and mobility management function network element can obtain an identifier of the access and mobility management function network element, to request the second access and mobility management function network element to serve the user.

In a possible design, the method further includes: when the second access and mobility management function network element does not exist in the area in which the user equipment is located, sending, by the network slice selection function network element, identification information of a second network slice instance in the first network slice to the first access and mobility management function network element. In this way, when there is no access and mobility management function network element that supports the first network slice type and the first network slice instance in the network, the core network may select the second access and mobility management function network element that supports the first network slice type to serve the user equipment, and requests the network slice selection function network element to determine a network slice instance supported by the second access and mobility management function network element to serve the user equipment.

According to another aspect, this application further discloses a network slicing-based communication method, and the method includes:

obtaining, by a first access and mobility management function network element, first information and second information, where the first information is used to indicate a type of a first network slice, the second information is used to identify a first network slice instance in the first network slice, and the first access and mobility management function network element supports the type of the first network slice and the first network slice instance; and sending, by the first access and mobility management function network element, the first information and the second information to user equipment or a data management function network element, where the first information and the second information are used for determining a second access and mobility management function network element, the second access and mobility management function network element supports the type of the first network slice and the network slice instance, and the first information and the second information are further used for determining a network slice instance that is in the first network slice and that serves the user equipment.

According to the foregoing method, before the user equipment moves, the user equipment or a core network may learn of a network slice instance that serves the user equipment. After the user equipment moves, the core network selects the same network slice instance that serves the user equipment before the movement, to ensure that a session established before the user equipment moves is not interrupted, thereby improving user experience.

In a possible design, the sending, by the first access and mobility management function network element, the first information and the second information to user equipment or a data management function network element includes: sending, by the first access and mobility management function network element, a registration accept message to the user equipment, where the registration accept message includes the first information and the second information; or sending, by the first access and mobility management function network element, a session establishment accept message to the user equipment, where the session establishment accept message includes the first information and the second information. Therefore, the user equipment may learn of, in a registration process or a session establishment process, a type of a network slice that serves the user equipment before the movement and a corresponding network slice instance.

According to another aspect, this application further discloses a network slicing-based communication method, and the method includes:

receiving, by a network slice selection function network element, first information and indication information from an access and mobility management function network element, where the first information is used to indicate a type of a network slice, the indication information is used to request to determine a network slice instance that is in the network slice and that serves user equipment, and the access and mobility management function network element supports the type of the network slice and the network slice instance; and sending, by the network slice selection function network element, second information to the access and mobility management function network element, where the second information is used to identify a network slice instance in the network slice.

According to the foregoing method, when there is no access and mobility management function network element that supports a type of a first network slice and a first network slice instance in the network, a core network may select the network slice instance supported by the access and mobility management function network element to serve the user equipment.

According to another aspect, an embodiment of this application provides a network slicing-based communications apparatus. The network slicing-based communications apparatus has a function of implementing behavior of the radio access network device in the foregoing methods. This function may be implemented by hardware, or may be implemented by hardware by executing corresponding software. The hardware or the software includes one or more modules corresponding to the foregoing functions. In a possible design, a structure of the network slicing-based communications apparatus includes a processor and a transceiver. The processor is configured to process the network slicing-based communications apparatus to perform a corresponding function in the foregoing method. The transceiver is configured to implement communication between the network slicing-based communications apparatus and user equipment/an access and mobility management function network element. The network slicing-based communications apparatus may further include a memory. The memory is configured to couple to the processor, and stores a program instruction and data that are necessary for the network slicing-based communications apparatus.

According to another aspect, an embodiment of this application provides a network slicing-based communications apparatus. The network slicing-based communications apparatus has a function of implementing behavior of the access and mobility management function network element in the foregoing methods. This function may be implemented by hardware, or may be implemented by hardware by executing corresponding software. The hardware or the software includes one or more modules corresponding to the foregoing functions. In a possible design, a structure of the network slicing-based communications apparatus includes a processor and a transceiver. The processor is configured to process the network slicing-based communications apparatus to perform a corresponding function in the foregoing method. The transceiver is configured to implement communication between the network slicing-based communications apparatus and a radio access network device/a network slice selection function network element/user equipment.

The network slicing-based communications apparatus may further include a memory. The memory is configured to couple to the processor, and stores a program instruction and data that are necessary for the network slicing-based communications apparatus.

According to another aspect, an embodiment of this application provides user equipment. The user equipment has a function of implementing behavior of the user equipment in the foregoing methods. This function may be implemented by hardware, or may be implemented by hardware by executing corresponding software. The hardware or the software includes one or more modules corresponding to the foregoing functions. In a possible design, a structure of the user equipment includes a transceiver. The transceiver is configured to implement communication between the user equipment and a radio access network device/a second access and mobility management function network element/a third access and mobility management function network element/an interworking network element. The user equipment may further include a memory. The memory is configured to couple to the processor, and stores a program instruction and data that are necessary for the user equipment.

According to another aspect, an embodiment of this application provides a network slicing-based communications apparatus. The network slicing-based communications apparatus has a function of implementing behavior of the first access and mobility management function network element in the foregoing methods. This function may be implemented by hardware, or may be implemented by hardware by executing corresponding software. The hardware or the software includes one or more modules corresponding to the foregoing functions. In a possible design, a structure of the network slicing-based communications apparatus includes a transceiver. The transceiver is configured to implement communication between the network slicing-based communications apparatus and a data management function network element/a network slice selection function network element. The network slicing-based communications apparatus may further include a memory. The memory is configured to couple to the processor, and stores a program instruction and data that are necessary for the network slicing-based communications apparatus.

According to another aspect, an embodiment of this application provides a network slicing-based communications apparatus. The network slicing-based communications apparatus has a function of implementing behavior of the data management function network element in the foregoing methods. This function may be implemented by hardware, or may be implemented by hardware by executing corresponding software. The hardware or the software includes one or more modules corresponding to the foregoing functions. In a possible design, a structure of the network slicing-based communications apparatus includes a transceiver. The transceiver is configured to implement communication between the network slicing-based communications apparatus and a first access and mobility management function network element/a second access and mobility management function network element. The network slicing-based communications apparatus may further include a memory. The memory is configured to couple to the processor, and stores a program instruction and data that are necessary for the network slicing-based communications apparatus.

According to another aspect, an embodiment of this application provides a network slicing-based communications apparatus. The network slicing-based communications apparatus has a function of implementing behavior of the network slice selection function network element in the foregoing methods. This function may be implemented by hardware, or may be implemented by hardware by executing corresponding software. The hardware or the software includes one or more modules corresponding to the foregoing functions. In a possible design, a structure of the network slicing-based communications apparatus includes a processor and a transceiver. The processor is configured to process the network slicing-based communications apparatus to perform a corresponding function in the foregoing method. The transceiver is configured to implement communication between the network slicing-based communications apparatus and a first access and mobility management function network element. The network slicing-based communications apparatus may further include a memory. The memory is configured to couple to the processor, and stores a program instruction and data that are necessary for the network slicing-based communications apparatus.

According to another aspect, an embodiment of this application provides a computer-readable storage medium. The computer readable storage medium stores an instruction, and when the instruction runs on a computer, the computer is enabled to perform the methods in the foregoing aspects.

According to another aspect, an embodiment of this application provides a computer program product including an instruction. When the computer program product runs on a computer, the computer is enabled to perform the methods in the foregoing aspects.

According to another aspect, this application provides a chip system. The chip system includes a processor, configured to support the foregoing network slicing-based communications apparatus or user equipment in implementing the functions in the foregoing aspects, for example, generating or processing information in the foregoing methods. In a possible design, the chip system further includes a memory, and the memory is configured to store a program instruction and data that are necessary for a data sending device. The chip system may include a chip, or may include a chip and another discrete components.

BRIEF DESCRIPTION OF DRAWINGS

To describe the technical solutions in embodiments of the present invention more clearly, the following describes the accompanying drawings required in the embodiments of the present invention or the background.

DESCRIPTION OF EMBODIMENTS

The following clearly describes technical solutions in embodiments of this application with reference to the accompanying drawings in the embodiments of this application. "A plurality of" in this application means two or more.

Figure 1:
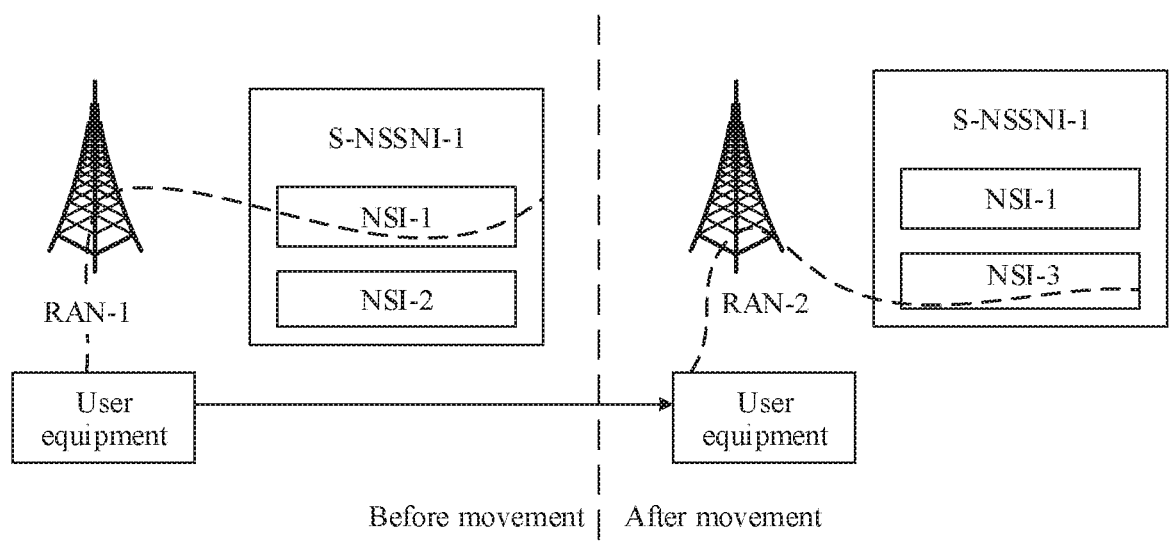
FIG. 1 is a schematic diagram of a scenario in which user equipment selects network slice instances before and after movement.
Figure 2:
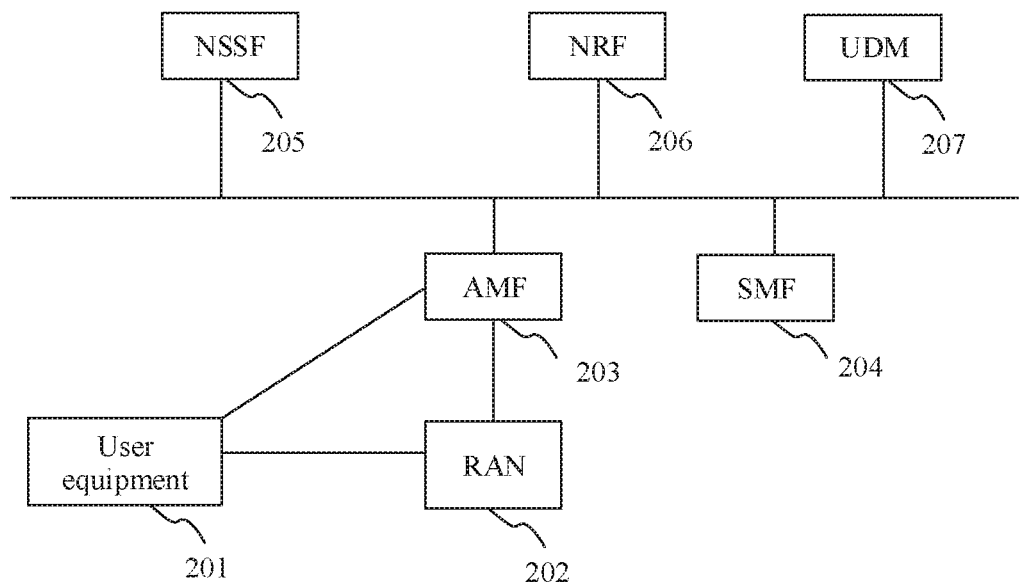
FIG. 2 is a schematic diagram of a 5G communications system according to an embodiment of this application.

FIG. 2 is a schematic diagram of a 5G communications system according to an embodiment of this application. In a 5G mobile network architecture, a control plane function and a forwarding plane function of a mobile gateway are decoupled. The separated control plane function is combined with a conventional control network element, that is, a mobility management entity (MME), or the like in a third generation partnership project (3GPP), forming a unified control plane. A user plane function (UPF) network element can implement user plane functions (SGW-U and PGW-U) of a serving gateway (SGW) and a packet data network gateway (PGW). Further, the unified control plane network element may be divided into an access and mobility management function (AMF) network element and a session management function (SMF) network element.

As shown in FIG. 2, the communications system includes at least user equipment (UE) 201, a RAN device 202, an AMF network element 203, a network slice selection function (NSSF) network element 205, and a unified data management (UDM) network element 207.

The user equipment 201 in this system is not limited to user equipment of a 5G network, and may include a mobile phone, an internet of things device, a smart home device, an industrial control device, a vehicle device, and the like. The user equipment may also be referred to as terminal equipment, a mobile station, a mobile, a remote station, a remote terminal, an access terminal, a user equipment, or a user agent. This is not limited herein. The user equipment may alternatively be a vehicle in vehicle-to-vehicle (V2V) communication, a machine in machine-type communication, or the like.

The RAN device 202 is an apparatus configured to provide a wireless communication function for the user equipment 201. The RAN device 202 may include base stations in one of various forms, for example, a macro base station, a micro base station (also referred to as a small cell), a relay station, and an access point. In systems that use different radio access technologies, names of a device that has a base station function may be different. For example, in an LTE system, the device is referred to as an evolved NodeB (eNB or eNodeB); in a $3^{rd}$ generation (3G) system, the device is referred to as a NodeB. In a next-generation system, the device is referred to as a gNB (gNodeB).

The AMF network element 203 in the system may be responsible for registration, mobility management, a tracking area update process, and the like of the terminal device. The AMF network element may also be referred to as an AMF device or an AMF entity.

The NSSF network element 205 in the system can select a network slice for the user equipment. The NSSF network element may also be referred to as an NSSF device or an NSSF entity.

The UDM network element 207 involved in this system can store subscription data of a user. For example, the subscription data of the user includes subscription data related to mobility management and subscription data related to session management. The UDM network element may also be referred to as a UDM device or a UDM entity.

Optionally, network devices in the 5G communications system shown in FIG. 2 further includes an SMF network element 204. The SMF network element 204 may be responsible for session management of the terminal device. For example, session management includes user plane device selection, user plane device reselection, internet protocol (IP) address allocation, quality of service (QoS) control, and session establishment, modification, or release.

Optionally, the 5G communications system further includes a network function repository function (NRF) network element 206. The network element can provide a service discovery function. Optionally, the NRF network element 206 can further maintain information about a valid network function network element in a core network. Optionally, the NRF network element 206 can further maintain a service supported by the valid network function network element in the core network.

In the 5G communications system shown in FIG. 2, in a registration process, the user equipment 201 selects an initial AMF network element (for example, the AMF network element 203) by using the RAN device 202, and the initial AMF network element obtains subscription data of the user equipment 201 from the UDM network element 207. If the initial AMF network element determines, based on the subscription data, that the initial AMF network element cannot serve the user equipment 201, the initial AMF network element requests the NSSF network element 205 to select another AMF network element that can meet a user requirement to serve the user equipment 201. After the user equipment accesses a network, the another AMF network element requests the NSSF network element 205 to select the appropriate NRF network element 206. Then, the AMF network element 203 may learn of, by requesting the NRF network element 206, information about the SMF network element 204 that meets the requirement, and thereby perform session establishment, modification, or release by using the SMF network element 204.

The foregoing network elements may be network elements implemented on dedicated hardware, software instances running on dedicated hardware, or instances of virtualized functions on an appropriate platform. For example, the foregoing virtualization platform may be a cloud platform.

In addition, the embodiments of this application may be further applicable to another future-oriented communications technology. The network architecture and the service scenario described in this application are used to describe the technical solutions in this application more clearly, and do not constitute a limitation on the technical solutions provided in this application. A person of ordinary skill in the art may know that, with evolution of network architectures and emergence of new service scenarios, the technical solutions provided in this application are also applicable to similar technical problems.

The following uses the 5G communications system shown in FIG. 2 as an example, to describe in detail the technical solutions of this application with some embodiments. The following several embodiments may be combined with each other, and same or similar concepts or processes may not be described repeatedly in some embodiments.

Figure 3:
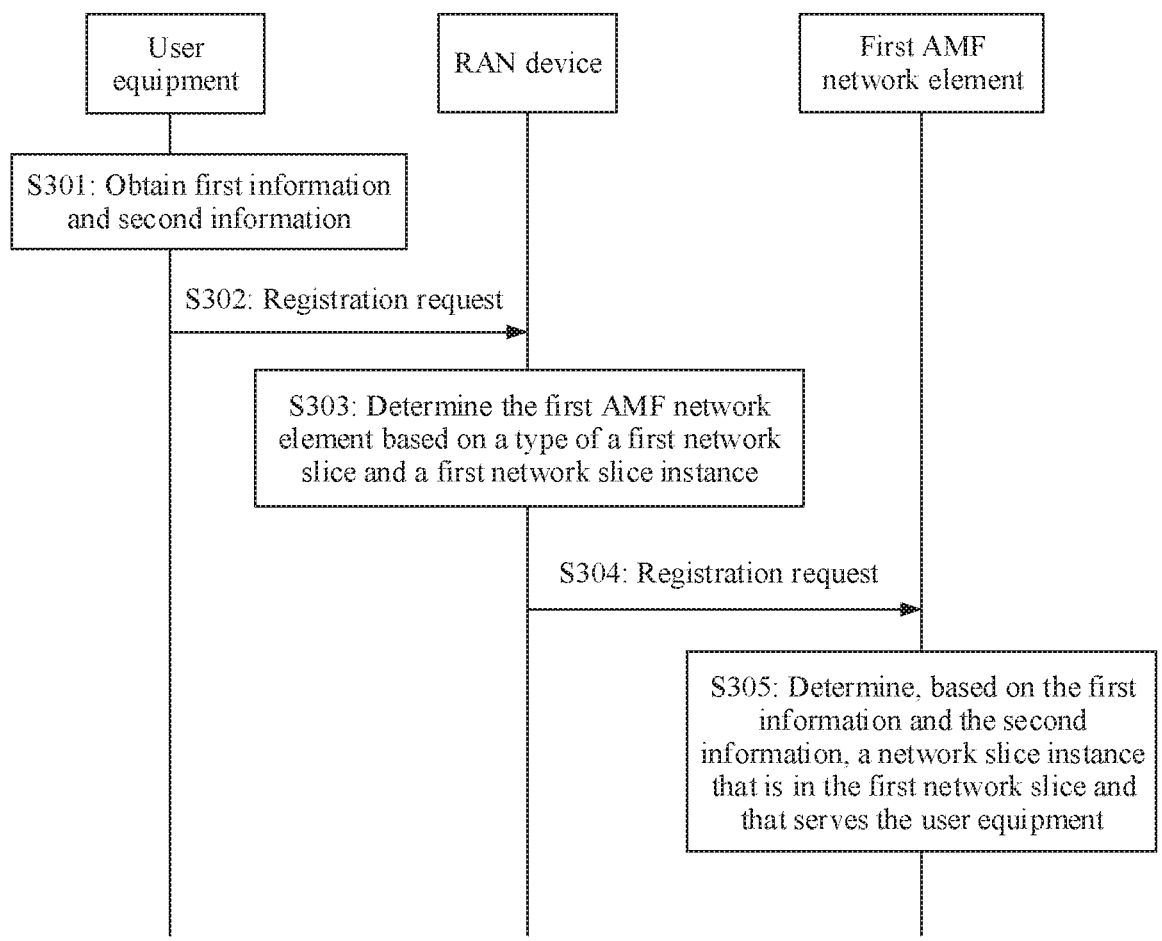
FIG. 3 shows a network slicing-based communication method according to an embodiment of this application.

FIG. 3 shows a network slicing-based communication method according to an embodiment of this application. According to the method, a RAN device may determine a first AMF network element that can support a network slice required by user equipment, and the first AMF network element determines, based on a requirement of the user equipment, a network slice instance that is in the network slice and that serves the user equipment. As shown in FIG. 3, the method may include the following steps.

S301: The user equipment obtains first information and second information. The first information is used to indicate a type of a first network slice, and the second information is used to identify a first network slice instance in the first network slice.

For example, the user equipment is the user equipment 201 in FIG. 2. The first information may be first S-NSSAI. The first network slice instance that is indicated by the first S-NSSAI and that is in the network slice is a first NSI. The second information may be information about the first NSI. For example, the information about the first NSI may be an identifier (ID) of the first NSI.

For example, the user equipment may obtain the first information and the second information in any one of the following three manners.

In a first possible implementation, the user equipment may obtain the first information and the second information in a registration process.

For example, the user equipment receives a registration accept message from a second AMF network element, to obtain the first information and the second information. The registration accept message includes the first information and the second information. The second AMF network element supports the type of the first network slice and the first network slice instance.

For example, before moving, the user equipment accesses the first network slice instance in the first network slice by using the second AMF network element after registering with the network, and establishes a session by using a network element in the first network slice instance. In this registration process, the second AMF network element may obtain network slice selection assistance information (NSSAI) allowed by the current network. NSSAI is a set of S-NSSAI. The allowed NSSAI represents a network slice type that the user equipment can use in the current network. One or more network slice instances may be deployed in each network slice corresponding to a piece of S-NSSAI in the allowed NSSAI. For example, the network slices corresponding to the S-NSSAI in the allowed NSSAI and the network slice instances have correspondences shown in Table 1. In the example of Table 1, the allowed NSSAI includes S-NSSAI-1 and S-NSSAI-2. Network slice instances deployed in a network slice corresponding to S-NSSAI-1 include NSI-1 and NSI-1*, and network slice instances deployed in a network slice corresponding to S-NSSAI-2 include NSI-2 and NSI-2*.

TABLE 1

| S-NSSAI in the allowed NSSAI | Network slice instances |
| --- | --- |
| S-NSSAI-1 | NSI-1, NSI-1* |
| S-NSSAI-2 | NSI-2, NSI-2* |

In the registration process, the network may determine, based on a load status of current different network slice instances or based on a type of the user equipment, a network slice instance that is in the network slice corresponding to the S-NSSAI in the allowed NSSAI and that serves the user equipment. In this way, the second AMF network element may obtain information about the network slice instances corresponding to the S-NSSAI in the allowed NSSAI. For example, the second AMF network element obtains correspondences between the network slices corresponding to the S-NSSAI in the allowed NSSAI and network slice instances that serve the user equipment as shown in Table 2. In the example of Table 2, the allowed NSSAI includes S-NSSAI-1 and S-NSSAI-2. A network slice instance that is in the network slice corresponding to S-NSSAI-1 obtained by the second AMF network element and that serves the user equipment is NSI-1, and a network slice instance that is in the network slice corresponding to S-NSSAI-2 and that serves the user equipment is NSI-2.

TABLE 2

| S-NSSAI in the allowed NSSAI | Network slice instances that serve the user equipment |
| --- | --- |
| S-NSSAI-1 | NSI-1 |
| S-NSSAI-2 | NSI-2 |

The correspondences that are obtained by the second AMF network element and that are between the network slices corresponding to the S-NSSAI in the allowed NSSAI and the network slice instances that serve the user equipment include information about the first network slice, that is, the first information. For example, the first information is S-NSSAI-1. The correspondences further include information about the first network slice instance in the first network slice, that is, the second information. For example, the second information is information about NSI-1.

Further, the second AMF network element may obtain a plurality of correspondences between the network slices corresponding to the S-NSSAI in the allowed NSSAI and the network slice instances serving the user equipment. The first information may include the type of the first network slice that is in the plurality of correspondences and that is associated with the session of the user equipment before the movement. Correspondingly, the second information may include information about the first network slice instance corresponding to the first network slice. For example, the plurality of correspondences obtained by the user equipment include a correspondence between S-NSSAI-1 and NSI-1 and a correspondence between S-NSSAI-2 and NSI-2. The first information includes S-NSSAI-1 in Table 2, and the second information includes the network slice instance NSI-1 corresponding to S-NSSAI-1.

Further, optionally, if the user equipment establishes a plurality of sessions before the movement, the first information may include types of a plurality of first network slices associated with the plurality of sessions. Correspondingly, the second information may include a plurality of first network slice instances respectively corresponding to the plurality of first network slices. For example, before the movement, the user equipment separately accesses, by using two sessions, network slices corresponding to S-NSSAI-1 and S-NSSAI-2. The first information includes S-NSSAI-1 and S-NSSAI-2 in Table 2, and the second information includes the network slice instance NSI-1 corresponding to S-NSSAI-1 and the network slice instance NSI-2 corresponding to S-NSSAI-2.

Then, the second AMF network element sends the correspondence to the user equipment by using the registration accept message, so that the user equipment obtains the first information and the second information. For example, before the movement, the user equipment establishes a session by using the first network slice instance NSI-1 in the first network slice corresponding to S-NSSAI-1. After the movement, the user equipment requests the first network slice associated with the session before the movement to continue serving the user equipment. In this case, the user equipment may learn, based on the correspondences shown in Table 2, that the network slice instance in the network slice corresponding to S-NSSAI-1 is NSI-1. Therefore, the user equipment requests to access, in a new network, NSI-1 in the first network slice corresponding to the S-NSSAI-1, and establish a session.

In a second possible implementation, the user equipment may obtain the first information and the second information in a session establishment process.

For example, in the session establishment process, the user equipment receives a session establishment accept message from a third AMF network element. The session establishment accept message includes the first information and the second information. The third AMF network element supports the type of the first network slice and the first network slice instance. A process in which the user equipment obtains the first information and the second information from the third AMF network element by using the session establishment accept message may be further described with reference to FIG. 6.

In a third possible implementation, the user equipment receives the first information and the second information from an interworking network element. The interworking network element supports a session management function of a first network and a session management function of a second network. For example, the interworking network element supports a control plane function of a PGW network element in $4^{th}$ Generation (4G) communications, and can communicate with an MME network element; and the interworking network element further supports a function of an SMF network element in 5G, and can communicate with an AMF network element. A process in which the user equipment receives the first information and the second information from the interworking network element may be further described with reference to FIG. 7.

S302: The user equipment sends a registration request to the RAN device. Correspondingly, the RAN device receives the registration request from the user equipment. The registration request includes the first information and the second information, the first information and the second information are used for determining the first AMF network element, and the first information and the second information are further used for determining the network slice instance that is in the first network slice and that serves the user equipment.

For example, the RAN device is the RAN device 202 in FIG. 2.

S303: The RAN device determines the first AMF network element based on the type of the first network slice and the first network slice instance.

For example, the first AMF network element is the AMF network element 203 in FIG. 2. For example, the RAN device obtains, in step S302, the type of the first network slice and the first network slice instance that are requested by the user equipment, and the RAN device determines the first AMF network element based on the type of the first network slice and the first network slice instance. For example, if the RAN device determines that types of network slices supported by the first AMF network element include the type of the first network slice, and network slice instances supported by the first AMF network element include the first network slice instance, the RAN device determines that the first AMF network element can serve the user equipment. A process in which the first AMF determines the network slice instance serving the user equipment may be further described subsequently in step S305. If the RAN device determines that types of network slices supported by the first AMF network element include the type of the first network slice, but network slice instances supported by the first AMF network element do not include the first network slice instance, and in the network, and there is no other AMF network element that supports both the type of the first network slice and the first network slice instance, the RAN device also temporarily determines that the first AMF network element serves the user equipment. A process in which the first AMF network element determines the network slice instance serving the user equipment may be further described with reference to subsequent step S305 and FIG. 4. A process in which the RAN device determines the first AMF network element is further described with reference to FIG. 5.

S304: The RAN device sends the foregoing registration request to the first AMF network element. Correspondingly, the first AMF network element receives the registration request from the RAN device. The first information and the second information are used for determining the network slice instance.

S305: The first AMF network element determines, based on the first information and the second information, the network slice instance that is in the first network slice and that serves the user equipment.

For example, the first AMF network element obtains, in step S304, the type of the first network slice and the first network slice instance that are requested by the user equipment. If the network slice instances supported by the first AMF network element include the first network slice instance in the network slice corresponding to the type of the first network slice, the first AMF network element determines that the network slice instance that is in the first network slice and that serves the user equipment is the first network slice instance. If the network slice instances supported by the first AMF network element do not include the first network slice instance, a process in which the first AMF network element determines the network slice instance serving the user equipment may be further described with reference to FIG. 4.

According to the method in this embodiment of the present invention, a core network can select the network slice instance that meets a requirement of the user equipment to serve the user equipment. When the user equipment moves, the user equipment may learn of the network slice instance that serves the user equipment before the movement. After the movement, the user equipment requests the same network slice instance from the core network, to ensure that the session established before the user equipment moves is not interrupted, thereby improving user experience.

Figure 4:
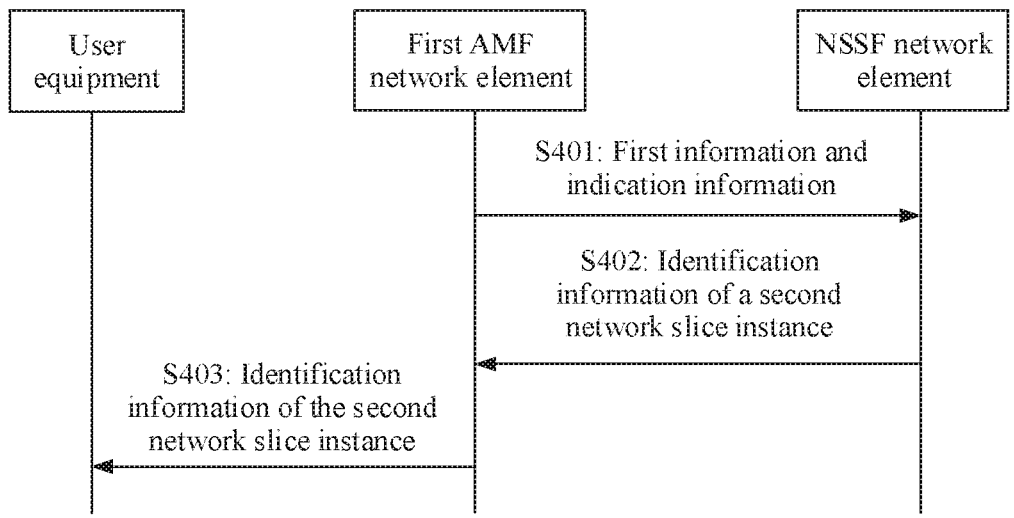
FIG. 4 shows a method for determining a network slice instance to serve user equipment according to an embodiment of this application.

FIG. 4 shows a method for determining a network slice instance to serve user equipment according to an embodiment of this application. The method may be used in a scenario in which the network slice instances supported by the first AMF network element serving the user equipment do not include the first network slice instance requested by the user equipment in FIG. 3. As shown in FIG. 4, the method may include the following steps.

S401: A first AMF network element sends first information and indication information to an NSSF network element. Correspondingly, the NSSF network element receives the first information and the indication information from the first AMF network element. The first information is used to indicate a type of a first network slice, and the indication information is used to request to determine a network slice instance that is in the first network slice and that serves user equipment.

For example, the NSSF network element is the NSSF network element 205 in FIG. 2, and the first information may be first S-NSSAI. Optionally, the first AMF network element further sends current location information of the user equipment to the NSSF network element, so that the NSSF network element learns of a network slice instance that is in the first network slice and that can be used by the user equipment at a current location. For example, the current location information of the user equipment may be a tracking area identity (TAI).

S402: The NSSF network element sends identification information of a second network slice instance to the first AMF network element. Correspondingly, the first AMF network element receives the identification information of the second network slice instance from the NSSF network element. The identification information of the second network slice instance is used to identify the second network slice instance. The second network slice instance is the network slice instance determined by the NSSF network element to serve the user equipment, and the second network slice instance is the network slice instance that is in the first network slice and that can be used by the user equipment at the current location.

For example, the identification information of the second network slice instance may be an ID of a second NSI. The second NSI is a network slice instance in a network slice corresponding to the first S-NSSAI.

S403: The first AMF network element sends the identification information of the second network slice instance to the user equipment. Correspondingly, the user equipment receives the identification information of the second network slice instance from the first AMF network element.

For example, the user equipment is the user equipment 201 in FIG. 2.

According to the method in this embodiment of the present invention, when an AMF network element serving the user equipment does not support the network slice instance requested by the user equipment, a core network may select a network slice instance supported by the AMF network element to serve the user equipment. In addition, the core network sends, to the user equipment, information about the network slice instance selected to serve the user equipment, so that after next movement, the user equipment requests the core network to select the same network slice instance to serve the user equipment. In this way, it can be ensured that a session currently established by the user equipment is not interrupted after the next movement, thereby improving user experience.

Figure 5:
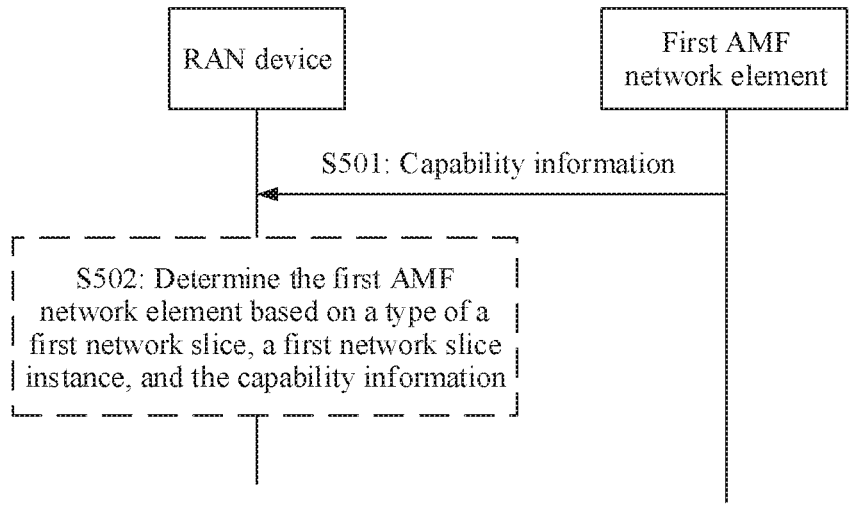
FIG. 5 shows a method for determining an AMF network element by a RAN device according to an embodiment of this application.

FIG. 5 shows a method for determining an AMF network element by a RAN device according to an embodiment of this application. According to the method, the RAN device may select, based on a type of a network slice and a network slice instance that are requested by the user equipment, the AMF network element to serve the user equipment. As shown in FIG. 5, the method may include the following steps.

S501: A first AMF network element sends capability information to the RAN device. Correspondingly, the RAN device receives the capability information from the first AMF network element. The capability information is used to indicate a network slice type and a network slice instance that are supported by the AMF network element.

For example, the first AMF network element is the AMF network element 203 in FIG. 2, the RAN device is the RAN device 202 in FIG. 2, the network slice type may be represented by S-NSSAI, and the network slice instance may be represented by NSI. For example, the first AMF network element has the capability information shown in Table 3. In the example of Table 3, network slice types supported by the first AMF network element include S-NSSAI-1 and S-NSSAI-2. Network slice instances in a network slice corresponding to S-NSSAI-1 supported by the first AMF network element include NSI-1 and NSI-1*, and network slice instances in a network slice corresponding to S-NSSAI-3 supported by the first AMF network element include NSI-3 and NSI-3*.

TABLE 3

| Network slice types supported by the first AMF network element | Network slice instances supported by the first AMF network element |
| --- | --- |
| S-NSSAI-1 | NSI-1, NSI-1* |
| S-NSSAI-3 | NSI-3, NSI-3* |

Similarly, the RAN device may further receive, from another AMF network element communicating with the RAN device, capability information of the another AMF network element. The capability information of the another AMF network element may have a same format as that in Table 3, and details are not described herein again. In this way, the RAN device obtains capability information of each AMF network element that communicates with the RAN device, for subsequent AMF network element selection.

S502: The RAN device determines the first AMF network element based on a type of a first network slice, a first network slice instance, and the capability information.

For example, the RAN device obtains the capability information of the first AMF network element and the capability information of the another AMF network element according to the foregoing step S501. In a registration process, the RAN device obtains, according to step S302 in FIG. 3, the type of the first network slice and the first network slice instance that are requested by the user equipment. For example, if the type of the first network slice is S-NSSAI-1, and the first network slice instance is NSI-1, the RAN device learns in step S303, based on the capability information of the first AMF network element in Table 3, that the network slice types supported by the first AMF network element include the type of the first network slice, and network slice instances that are supported by the first AMF network element and that correspond to the type of the first network slice include the first network slice instance. In this way, the RAN device determines the first AMF network element to serve the user equipment.

If the user equipment establishes a plurality of sessions before movement, the first information obtained in step S302 in FIG. 3 may include types of a plurality of first network slices associated with the plurality of sessions. Correspondingly, the second information may include a plurality of first network slice instances respectively corresponding to the plurality of first network slices. For example, the first information includes S-NSSAI-1 and S-NSSAI-2 in Table 2, and the second information includes the network slice instance NSI-1 corresponding to S-NSSAI-1 and the network slice instance NSI-2 corresponding to S-NSSAI-2. In this case, in step S502, the RAN device may select, based on the obtained capability information of each AMF network element, an AMF network element that supports both the network slice instance NSI-1 corresponding to S-NSSAI-1 and the network slice instance NSI-2 corresponding to S-NSSAI-2 as the first AMF network element.

According to the method in this embodiment of the present invention, the RAN device may learn of capabilities of the AMF network elements, and then select an AMF network element that supports the network slice type and the network slice instance that are requested by the user equipment, to serve the user equipment. Then, the AMF network element may select the network slice instance requested by the user equipment to serve the user equipment, to ensure that a session established before the user equipment moves is not interrupted, thereby improving user experience.

Figure 6:
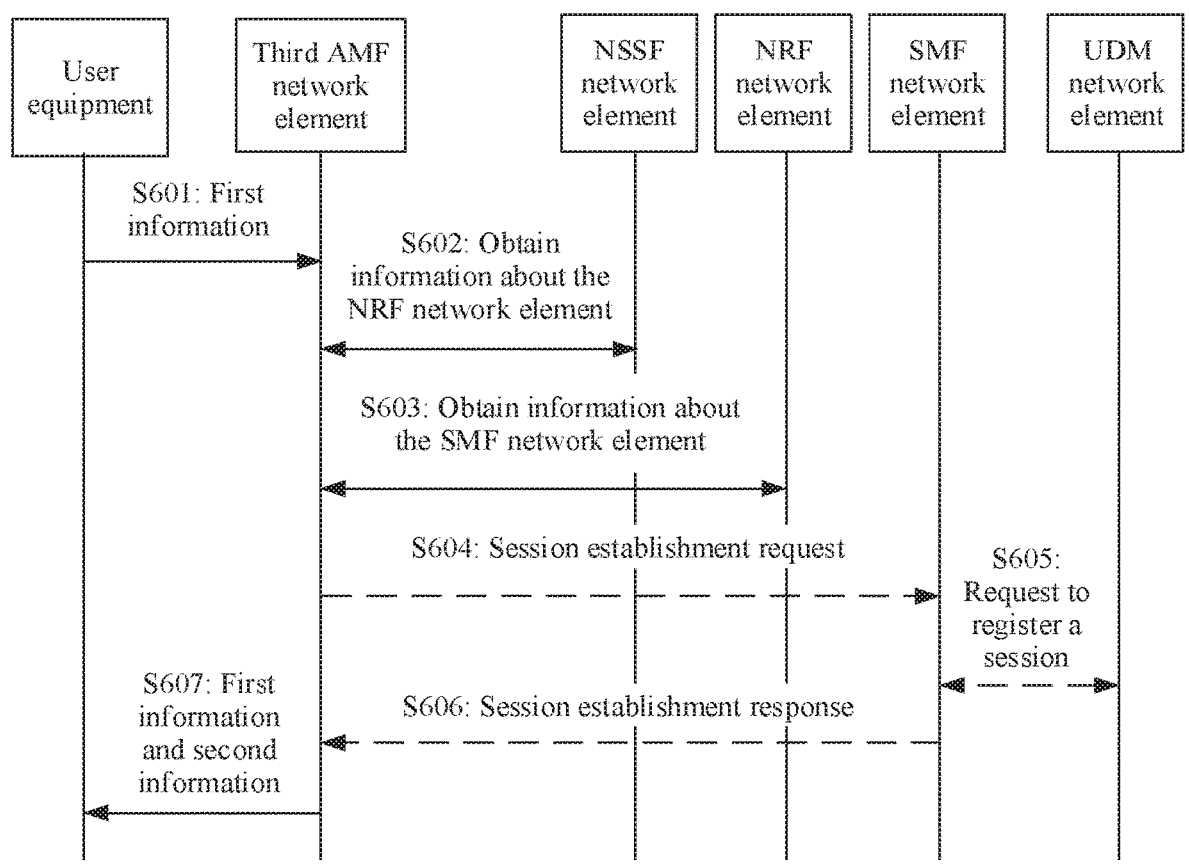
FIG. 6 shows a method for obtaining first information and second information by user equipment from a third AMF network element in a session establishment process according to an embodiment of this application.

FIG. 6 shows a method for obtaining first information and second information by user equipment from a third AMF network element in a session establishment process according to an embodiment of this application. As shown in FIG. 6, the method may include the following steps.

S601: The user equipment sends the first information to the third AMF network element. Correspondingly, the third AMF network element receives the first information from the user equipment. The first information is used to indicate a type of a first network slice.

For example, the user equipment is the user equipment 201 in FIG. 2. The first information may be first S-NSSAI.

For example, before movement, after registering in a network, the user equipment accesses, by using the third AMF network element, a first network slice instance in a network slice corresponding to the type of the first network slice, and establishes a session by using a network element in the first network slice instance. The first S-NSSAI is S-NSSAI associated with the session. For example, the user equipment may send the first information to the third AMF network element by using a session establishment request message.

S602: The third AMF network element obtains information about an NRF network element from an NSSF network element. For example, the NSSF network element is the NSSF network element 205 in FIG. 2.

If the third AMF network element obtains only allowed NSSAI in a registration process, that is, obtains the first S-NSSAI, the third AMF requests, from the NSSF network element, the information about the NRF network element used to select an SMF network element and information about a network slice instance corresponding to the first S-NSSAI. For example, the third AMF network element may send the first S-NSSAI to the NSSF network element by invoking an nnssf_nsselection_get service, to request to obtain the information about the NRF network element.

After receiving the request from the third AMF network element, the NSSF network element returns the information about the NRF network element to the third AMF network element. For example, the NRF network element is the NRF network element 206 in FIG. 2. For example, the NSSF network element may return the information about the NRF network element to the third AMF network element by sending an nnssf_nsselection_get response message.

S603: The third AMF network element obtains information about the SMF network element from the NRF network element.

The third AMF network element requests to obtain the information about the SMF network element from the NRF network element based on the information about the NRF network element returned by the NSSF network element in step S602. For example, the third AMF network element may send the first S-NSSAI to the NRF network element by invoking an nnrf_nfdiscovery_request service, to request to obtain the information about the SMF network element. After the third AMF network element invokes the nnrf_nfdiscovery_request service, the NRF network element returns the information about the SMF network element to the third AMF network element.

In a possible implementation, in step S602, the third AMF network element may further request information about the first network slice instance by invoking the nnssf_nsselection_get service. In this way, the third AMF network element obtains the second information from the NSSF network element. The second information is used to identify the first network slice instance in the first network slice. For example, the second information may be an ID of a first NSI, and the first NSI is a network slice instance in a network slice corresponding to the first S-NSSAI. For example, the NSSF network element may return the second information to the third AMF network element by sending an nnssf_nsselection_get response message.

In this case, when invoking the nnrf_nfdiscovery_request service in step S603, the third AMF network element further sends the second information to the NRF network element. In this way, the SMF network element determined by the NRF network element is an SMF network element in the first network slice instance indicated by the second information.

In another possible implementation, in step S603, the third AMF network element may further request the information about the first network slice instance by invoking the nnrf_nfdiscovery_request service. If the third AMF network element does not obtain the second information in step S602, the third AMF network element does not send the second information when invoking the nnrf_nfdiscovery_request service. In this case, the NRF network element returns, to the third AMF network element, the second information and the information about the SMF network element in the first network slice instance indicated by the second information, so that the third AMF network element obtains the second information.

S604: The third AMF network element sends a session establishment request to the SMF network element. Correspondingly, the SMF network element receives the session establishment request from the third AMF network element.

For example, the SMF network element is the SMF network element 204 in FIG. 2. The third AMF network element may send the first S-NSSAI to the SMF network element by invoking an nsmf_pdusession_createsmcontext request service, and request to establish a session.

Step S604 is an optional step. The third AMF network element may alternatively request to establish a session in another manner. This is not limited in the present invention.

S605: The SMF network element requests a UDM network element to register the session.

For example, the UDM network element is the UDM network element 207 in FIG. 2. The UDM network element is requested to register the session, so that the UDM network element may save an address of the SMF network element and an ID of the session; and the SMF network element may obtain subscription data that is of the user equipment and that is associated with the session, and subscribe to updated subscription data of the user equipment from the UDM network element.

Step S605 is an optional step. The SMF network element may alternatively obtain the subscription data of the user equipment in another manner. This is not limited in the present invention.

S606: The SMF network element sends a session establishment response to the third AMF network element. Correspondingly, the third AMF network element receives the session establishment response from the SMF network element.

For example, after invoking the nsmf_pdusession_createsmcontext request service, the SMF network element returns the session establishment response to the third AMF network element by sending an nsmf_pdusession_createsmcontext response message.

Step S606 is an optional step. The SMF network element may alternatively return the session establishment response in another manner. This is not limited in the present invention.

S607: The third AMF network element sends the first information and the second information to the user equipment. Correspondingly, the user equipment receives the first information and the second information from the third AMF network element.

It should be noted that, different from that the user equipment receives the registration accept message from the second AMF network element to obtain the first information and the second information, in the embodiment shown in FIG. 6, the first information and the second information obtained by the third AMF network element are the type of the network slice and the network slice instance that are associated with the current session of the user equipment. If the user equipment initiates establishment processes of a plurality of sessions before movement, the third AMF may perform the process in FIG. 6 for a plurality of times, to separately obtain information about network slice instances corresponding to each network slice associated with each session, and separately send the information to the user equipment. For example, network slices corresponding to each S-NSSAI of a plurality of sessions and network slice instances have correspondences that are shown in Table 4 and that are received by the user equipment. In the example of Table 4, the user equipment initiates two session establishment processes: session-1 and session-2. A type of a network slice used by session-1 is S-NSSAI-1, and a network slice instance in a network slice corresponding to S-NSSAI-1 is NSI-1. A type of a network slice used by session-2 is S-NSSAI-2, and a network slice instance in a network slice corresponding to S-NSSAI-2 is NSI-2.

TABLE 4

| Sessions of the user equipment | Network slice types | Network slice instances |
|---|---|---|
| Session-1 | S-NSSAI-1 | NSI-1 |
| Session-2 | S-NSSAI-2 | NSI-2 |

According to the method in this embodiment of the present invention, when the user equipment obtains only the allowed NSSAI in the registration process, the user equipment can obtain, in the session establishment process, the information about the network slice instance corresponding to the S-NSSAI associated with the session. After the user equipment moves, the user equipment may request, from a core network, the network slice instance associated with the current session to serve the user equipment, to ensure that the session established before the user equipment moves is not interrupted, thereby improving user experience.

Figure 7:
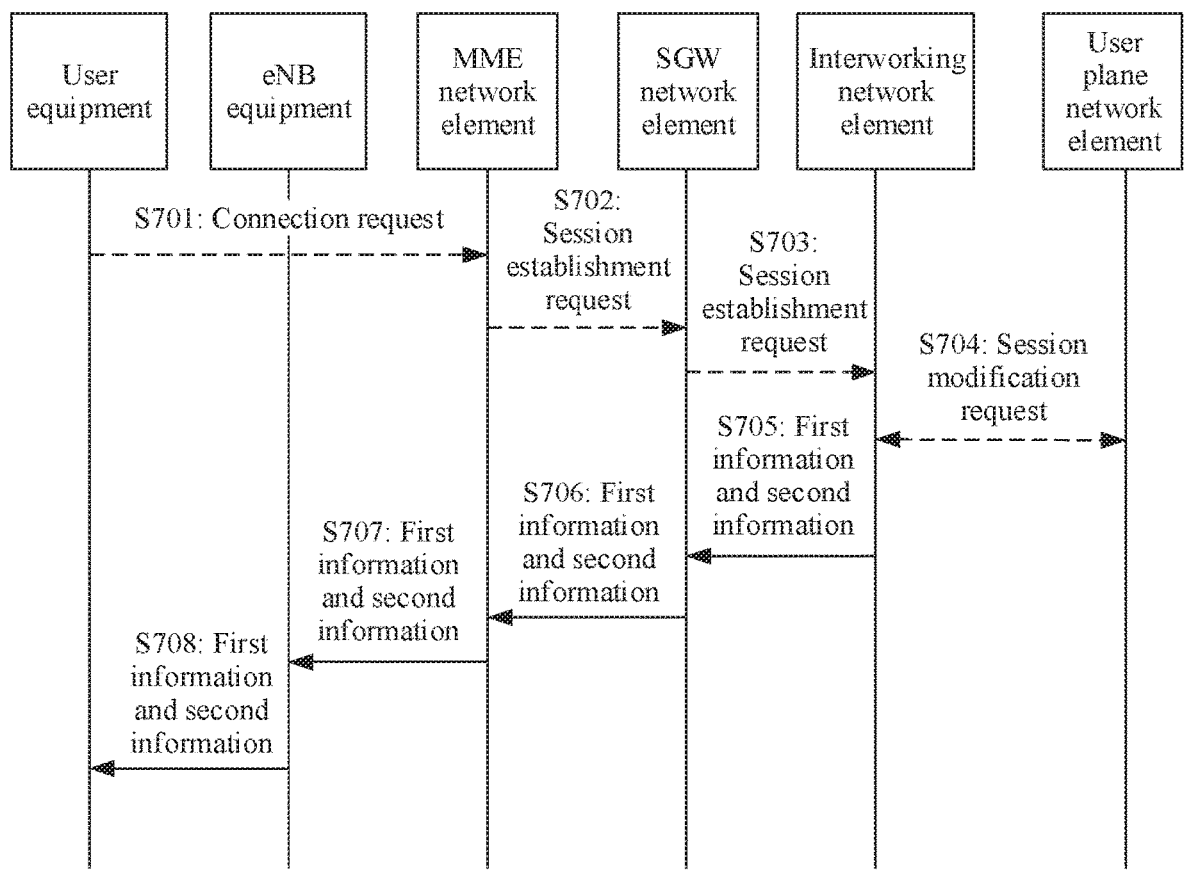
FIG. 7 shows a method for receiving first information and second information by user equipment from an interworking network element according to an embodiment of this application.

FIG. 7 shows a method for receiving first information and second information by user equipment from an interworking network element according to an embodiment of this application. The method may be used in a scenario in which the user equipment supports interworking between 4G and 5G. As shown in FIG. 7, the method may include the following steps.

S701: The user equipment sends a connection request to an MME network element. Correspondingly, the MME network element receives the connection request from the user equipment.

For example, the user equipment is the user equipment 201 in FIG. 2, and the user equipment is applicable to both a 4G network and a 5G network. The connection request may be a packet data network (PDN) connectivity request (PDN Connectivity Request) message. Optionally, the user equipment may further send an access point name (APN) and PDU session identification information to the MME network element, to request to establish a PDN connection.

S702: The MME network element sends a session establishment request to an SGW network element. Correspondingly, the SGW network element receives the session establishment request from the MME network element.

For example, the session establishment request may be a create session request message, used to request the SGW network element to establish a default bearer. Optionally, the session establishment request message further includes an international mobile subscriber identity (IMSI) and the PDU session identification information.

S703: The SGW network element sends a session establishment request to the interworking network element. Correspondingly, the interworking network element receives the session establishment request from the SGW network element.

For example, the interworking network element supports both a control plane function of a PGW network element in 4G communication and a function of an SMF network element in 5G. The session establishment request may be a create session request message. The SGW network element creates a new evolved packet system (EPS) bearer in an EPS bearer list, and sends the create session request message to the interworking network element.

S704: The interworking network element initiates a session modification request to a user plane network element. The session modification request includes an internet protocol (IP) address of a session.

For example, the user plane network element supports both a user plane function of a PGW network element in 4G communication and a function of a UPF network element in 5G.

S705: The interworking network element sends the first information and the second information to the SGW network element. Correspondingly, the SGW network element receives the first information and the second information from the interworking network element. The first information is used to indicate a type of a first network slice, and the second information is used to identify a first network slice instance in the first network slice. The first network slice serves the user equipment in the 5G network. In this case, the interworking network element is an SMF network element in the first network slice instance.

For example, the first information may be first S-NSSAI, and the second information may be an ID of a first NSI. The first NSI is a network slice instance in a network slice corresponding to the first S-NSSAI. Because the interworking network element supports the function of an SMF network element in 5G, a type of a network slice corresponding to the SMF network element and a corresponding network slice instance are configured in the interworking network element. In a PDN connection process of 4G communication, the interworking network element may determine, based on the foregoing configuration, the type of the first network slice serving the user equipment in the 5G network and the first network slice instance. For example, the interworking network element may send the first information and the second information to the SGW network element by using a create session request message.

S706: The SGW network element sends the first information and the second information to the MME network element. Correspondingly, the MME network element receives the first information and the second information from the SGW network element.

For example, the SGW network element may send the first information and the second information to the MME network element by using a create session request message.

S707: The MME network element sends the first information and the second information to an eNB device. Correspondingly, the eNB device receives the first information and the second information from the MME network element.

For example, the MME network element may send the first information and the second information to the eNB by using a PDN connectivity accept message.

S708: The eNB device sends the first information and the second information to the user equipment. Correspondingly, the user equipment receives the first information and the second information from the eNB device.

For example, the eNB device may send the first information and the second information to the user equipment by using a PDN connectivity accept message.

According to the method in this embodiment of the present invention, when the user equipment supports interworking between 4G and 5G, after creating PDN connectivity in the 4G network, the user equipment can obtain the information about the network slice instance corresponding to S-NSSAI associated with the session. When the user equipment uses the 5G network, the user equipment may request, from the core network, the network slice instance associated with the current session to serve the user equipment, to ensure that the session established when the user equipment switches from the 4G network to the 5G network is not interrupted, thereby improving user experience.

Figure 8:
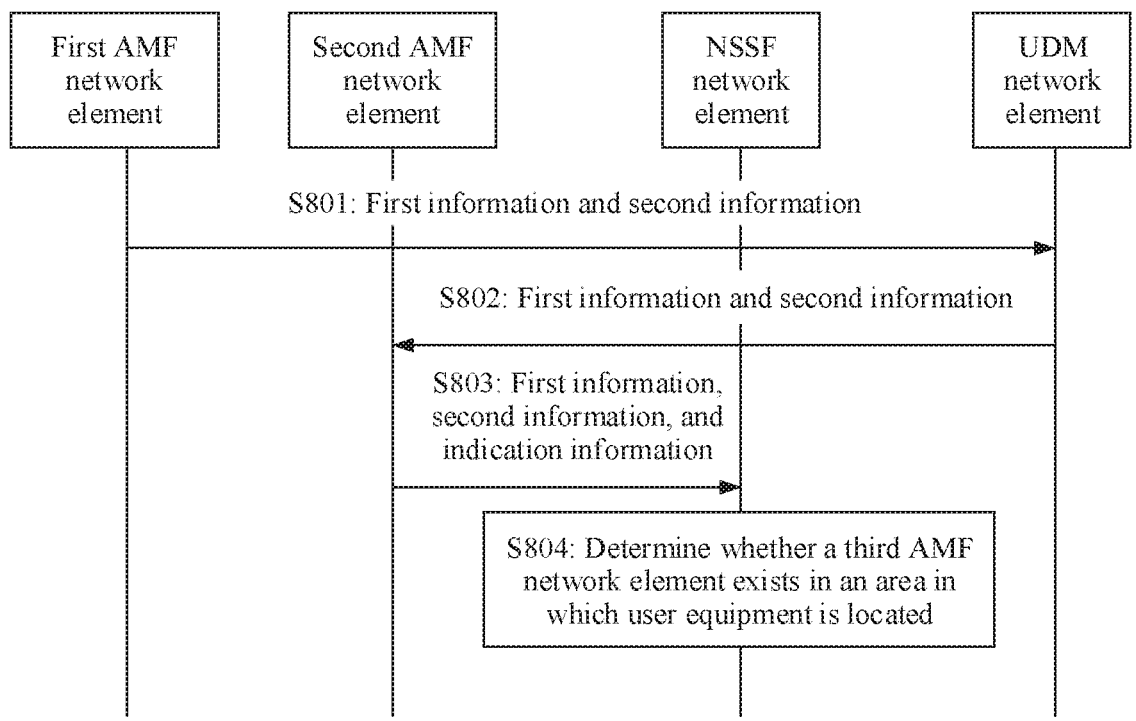
FIG. 8 shows another network slicing-based communication method according to an embodiment of this application.

FIG. 8 shows another network slicing-based communication method according to an embodiment of this application. The method may be used in a scenario in which a core network determines, based on a type of a network slice and information about a network slice instance that are stored in a UDM network element, a network slice instance to serve user equipment. As shown in FIG. 8, the method may include the following steps.

S801: A first AMF network element sends first information and second information to the UDM network element. Correspondingly, the UDM network element receives the first information and the second information from the first AMF network element. The first information is used to indicate a type of a first network slice, and the second information is used to identify a first network slice instance in the first network slice.

For example, the first AMF network element is an AMF network element in a network in which the user equipment is located before movement, and the UDM network element is the UDM network element 207 in FIG. 2. The first information may be a first S-NSSAI, and the second information may be an ID of a first NSI. The first NSI is a network slice instance in a network slice corresponding to the first S-NSSAI.

For example, the first AMF network element may send the first information and the second information to the UDM network element in either of the following two implementations.

In a possible implementation, the first AMF network element sends the first information and the second information to the UDM network element in a registration process. For example, in the registration process, after receiving a session establishment response message returned by an SMF network element, the first AMF network element sends, to the UDM network element, information about a network slice instance corresponding to S-NSSAI in allowed NSSAI. For a correspondence between a network slice corresponding to the S-NSSAI in the allowed NSSAI received by the UDM network element and a network slice instance serving the user equipment, refer to Table 2 in the embodiment of FIG. 3. Details are not described herein again.

In another possible implementation, the first AMF network element sends the first information and the second information to the UDM network element in a session establishment process. For obtaining the second information by the first AMF network element, refer to the description of step S602 or S603 in the embodiment of FIG. 6. Details are not described herein again. After obtaining the second information, the first AMF network element sends the first information and the second information to the UDM network element.

S802: The UDM network element sends the first information and the second information to a second AMF network element. Correspondingly, the second AMF network element receives the first information and the second information from the UDM network element.

For example, the second AMF network element is an AMF network element that the user equipment accesses in a network after the movement.

For example, after receiving a registration request of the user equipment, the second AMF network element requests, from the UDM network element, to obtain a context of the user equipment. After receiving a request message sent by the second AMF network element for obtaining the context of the user equipment, the UDM network element sends the first information and the second information to the second AMF network element.

S803: When the second AMF network element does not support the first network slice instance identified by the second information, the second AMF network element sends the first information, the second information, and indication information to an NSSF network element. Correspondingly, the NSSF network element receives the first information, the second information, and the indication information from the second AMF network element. The indication information is used to request to determine a third AMF network element that supports the type of the first network slice and the first network slice instance.

For example, the NSSF network element is the NSSF network element 205 in FIG. 2. After receiving the first information and the second information, the second AMF network element determines that the second AMF network element cannot support the first network slice instance in the first network slice, and therefore requests the NSSF network element to select, based on the first information and the second information, the third AMF network element that supports the type of the first network slice and the first network slice instance to serve the user equipment.

Optionally, the second AMF network element sends current location information of the user equipment to the NSSF network element, so that the NSSF network element can select the third AMF network element that can serve the user equipment at a current location of the user equipment. For example, the current location information of the user equipment may be a TAI.

S804: The NSSF network element determines whether the third AMF network element exists in an area in which the user equipment is located.

For example, the user equipment is the user equipment 201 in FIG. 2. If the third AMF network element that can support the type of the first network slice and the first network slice instance exists in the area in which the user equipment is located, the NSSF network element sends identification information of the third AMF network element to the second AMF network element. This process may be further described with reference to FIG. 9. If no third AMF network element that can support the type of the first network slice and the first network slice instance exists in the area in which the user equipment is located, the NSSF determines a second network slice instance supported by the second AMF network element to serve the user equipment. This process may be further described with reference to FIG. 10A and FIG. 10B.

According to the method in this embodiment of the present invention, before the user equipment moves, a network slice instance serving the user equipment is stored in the core network. After the user equipment moves, the core network can select a network slice instance that is the same as that before the movement to serve the user equipment. In this way, it is ensured that a session established before the user equipment moves is not interrupted, thereby improving user experience. In addition, compared with the method provided in the embodiment of FIG. 3, in the method provided in this embodiment of the present invention, the core network stores the information about the network slice instance that is before the movement, and the user equipment and the RAN device do not need to learn of the information about the network slice instance, thereby saving storage space of the user equipment.

Figure 9:
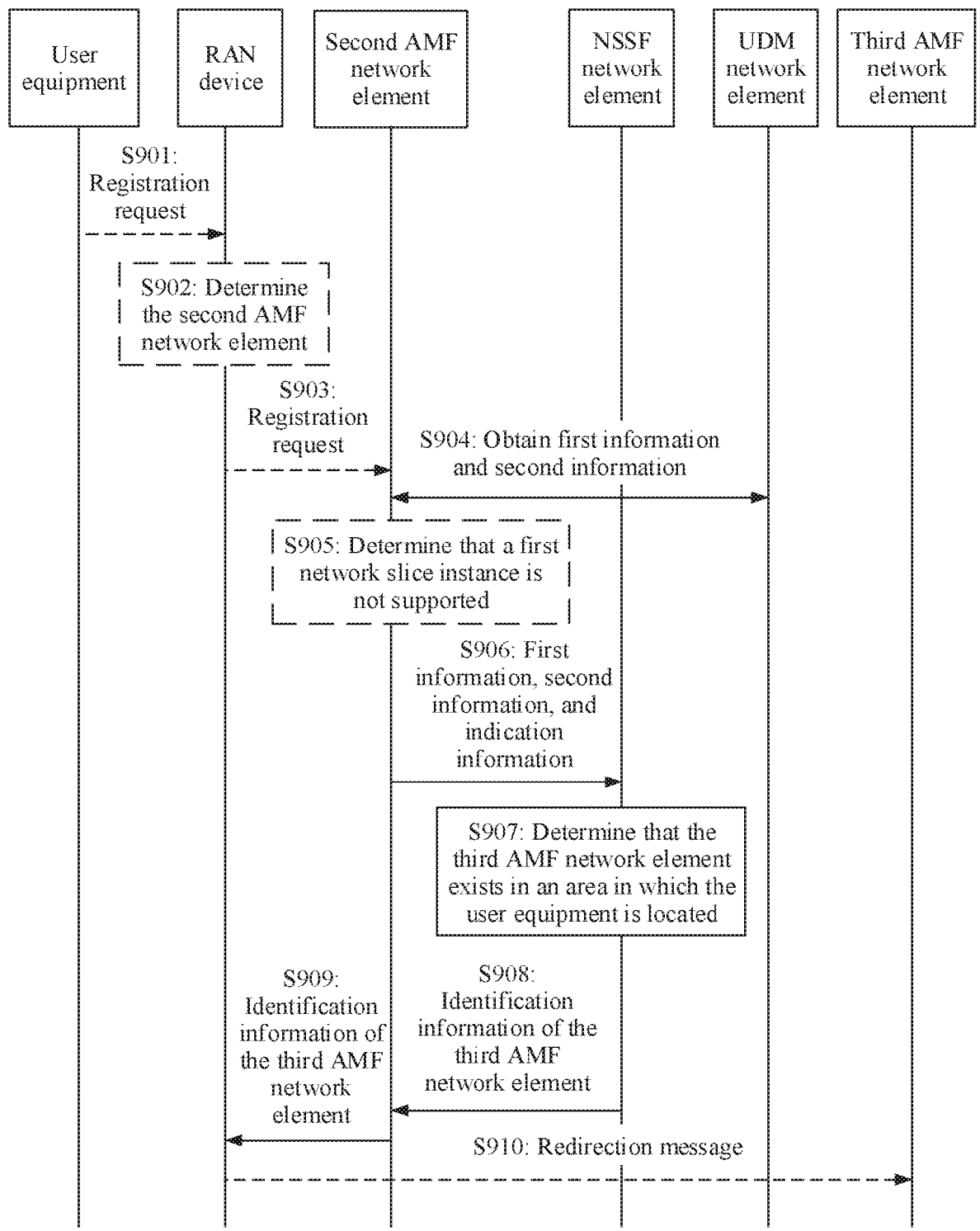
FIG. 9 shows another network slicing-based communication method according to an embodiment of this application.

FIG. 9 shows another network slicing-based communication method according to an embodiment of this application. The method may be used in a scenario in which when an NSSF network element determines that a third AMF network element that supports a first network slice instance exists in an area in which user equipment is located, the NSSF network element determines the third AMF network element to serve the user equipment. FIG. 9 is described with reference to FIG. 8. As shown in FIG. 9, the method may include the following steps.

S901: The user equipment sends a registration request to a RAN device. Correspondingly, the RAN device receives the registration request from the user equipment.

For example, the user equipment is the user equipment 201 in FIG. 2, and the RAN device is the RAN device 202 in FIG. 2. The registration request may be used by the user equipment to request to register at the network side after the user equipment moves. Optionally, the registration request may include NSSAI requested by the user equipment and a temporary identifier allocated by a first AMF network element for the user equipment. The first AMF network element is an AMF network element that the user equipment accesses before the movement. For example, the temporary identifier may be a 5G globally unique temporary identity (GUTI).

S902: The RAN device determines a second AMF network element.

For example, when the RAN device cannot connect to the first AMF network element based on the temporary identifier, the RAN device selects, based on the requested NSSAI, the second AMF network element to serve the user equipment. The second AMF network element can support a network slice corresponding to the NSSAI requested by the user equipment.

S903: The RAN device sends a registration request to the second AMF network element. Correspondingly, the second AMF network element receives the registration request from the RAN device.

S904: The second AMF network element obtains first information and second information from a UDM network element. The first information is used to indicate a type of a first network slice, and the second information is used to identify a first network slice instance in the first network slice.

For example, the UDM network element is the UDM network element 207 in FIG. 2. The first information may be first S-NSSAI, and the second information may be an ID of a first NSI. The first NSI is a network slice instance in a network slice corresponding to the first S-NSSAI. For example, the first network slice instance is a network slice instance that serves the user equipment before the user equipment moves.

After the second AMF network element receives the registration request in step S903, because the second AMF network element cannot obtain a context of the user equipment from the first AMF network element that allocates the temporary identifier, the second AMF network element obtains the context of the user equipment from the UDM network element when registering with the UDM network element. In addition, the second AMF network element further obtains the first information and the second information from the UDM network element. For example, the UDM network element may obtain the first information and the second information through step S801 in FIG. 8.

S905: The second AMF network element determines that the first network slice instance is not supported.

For example, through step S904, the second AMF network element learns that, before the movement, the user equipment uses a network slice instance NSI-1 in a network slice corresponding to S-NSSAI-1. However, capability information of the second AMF network element does not include NSI-1. Therefore, the second AMF network element determines that NSI-1 is not supported.

S906: The second AMF network element sends the first information, the second information, and indication information to the NSSF network element. Correspondingly, the NSSF network element receives the first information, the second information, and the indication information from the second AMF network element. The indication information is used to request to determine a third AMF network element that supports the type of the first network slice and the first network slice instance.

For step S906, refer to the description of step S803 in FIG. 8. Details are not described herein again.

S907: The NSSF network element determines that the third AMF network element exists in the area in which the user equipment is located.

For example, the NSSF network element determines, based on the first information and the second information, that the third AMF network element supporting the type of the first network slice and the first network slice instance exists in the area in which the user equipment is located.

S908: The NSSF network element sends identification information of the third AMF network element to the second AMF network element. Correspondingly, the second AMF network element receives the identification information of the third AMF network element from the NSSF network element.

S909: The second AMF network element sends the identification information of the third AMF network element to the RAN device. Correspondingly, the RAN device receives the identification information of the third AMF network element from the second AMF network element.

Optionally, after step S909 is performed, the RAN device performs step S910.

S910: The RAN device sends a redirection message to the third AMF network element. Correspondingly, the third AMF network element receives the redirection message from the RAN device. The redirection message is used to request the third AMF network element to serve the user equipment.

According to the method in this embodiment of the present invention, after the user equipment moves, the core network can obtain, from the UDM network element, information about the first network slice instance that serves the user equipment before the movement, and then select an AMF network element that supports the first network slice instance to serve the user equipment. In this way, it is ensured that a session established before the user equipment moves is not interrupted, thereby improving user experience. In addition, compared with the method provided in the embodiment of FIG. 3, in the method provided in this embodiment of the present invention, the UDM network element in the core network stores the information about the network slice instance that is before the movement, and the user equipment and the RAN device do not need to learn of the information about the network slice instance, thereby saving storage space of the user equipment.

Figure 10A:
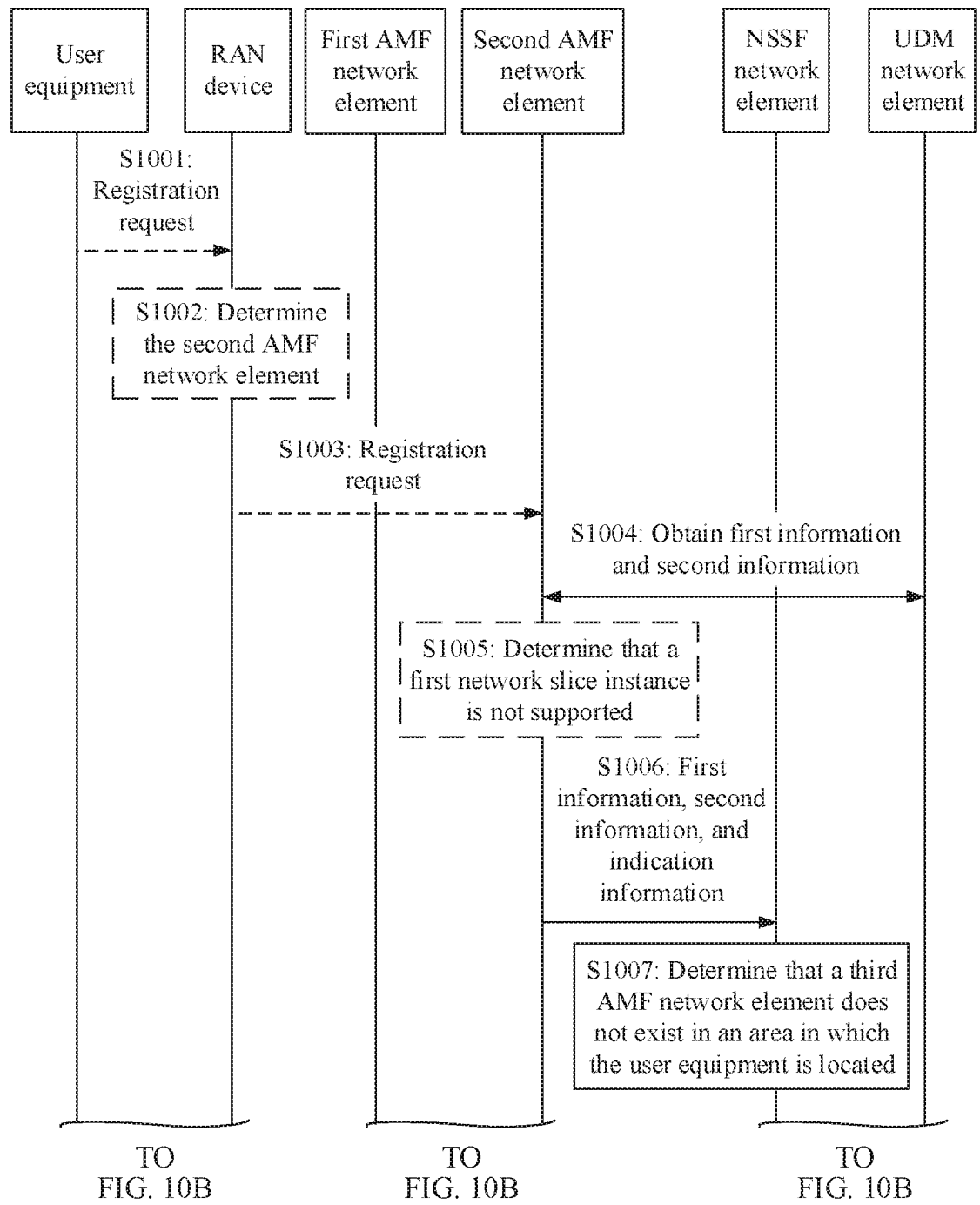
FIG. 10A and FIG. 10B show another network slicing-based communication method according to an embodiment of this application.
Figure 10B:
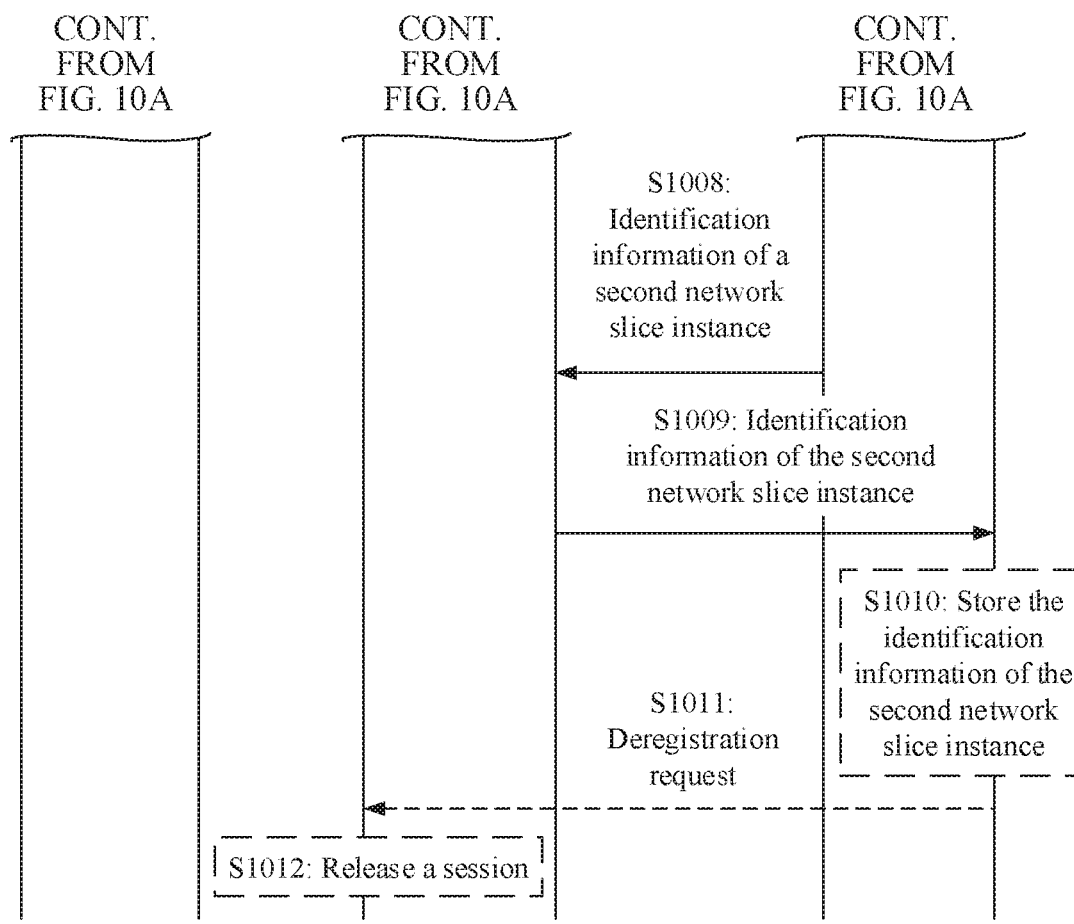

FIG. 10A and FIG. 10B show another network slicing-based communication method according to an embodiment of this application. The method may be used in a scenario in which when an NSSF network element determines that a third AMF network element that supports a first network slice instance does not exist in an area in which user equipment is located, the NSSF network element determines a network slice instance to serve the user equipment. FIG. 10A and FIG. 10B are described with reference to FIG. 9.

For step S1001 to step S1006, refer to the description of step S901 to S906 in FIG. 9. Details are not described herein again.

In the example in FIG. 10A and FIG. 10B, the method may further include the following steps.

S1007: The NSSF network element determines that the third AMF network element does not exist in the area in which the user equipment is located.

For example, the NSSF network element determines, based on the first information and the second information, that the third AMF network element supporting the first network slice instance in the type of the first network slice does not exist in the area in which the user equipment is located.

S1008: The NSSF network element sends identification information of second network slice instance to the second AMF network element. Correspondingly, the second AMF network element receives the identification information of the second network slice instance from the NSSF network element. The second network slice instance is a network slice instance that is in a network slice corresponding to the type of the first network slice and that is determined by the NSSF network element to serve the user equipment. The second AMF network element supports the second network slice instance.

For example, the identification information of the second network slice instance may be an ID of a second NSI.

S1009: The second AMF network element sends the identification information of the second network slice instance to the UDM network element. Correspondingly, the UDM network element receives the identification information of the second network slice instance from the second AMF network element.

Optionally, after step S1009 is performed, the UDM network element performs step S1010.

S1010: The UDM network element saves the identification information of the second network slice instance.

For example, before step S1009, the UDM network element stores the type of the first network slice serving the user equipment before the user equipment moves and identification information of the first network slice instance serving the user equipment before the user equipment moves. Through step S1010, the UDM network element saves the type of the first network slice serving the user equipment after the user equipment moves and the identification information of the second network slice instance serving the user equipment after the user equipment moves.

S1011: The UDM network element sends a deregistration request to the first AMF network element. Correspondingly, the first AMF network element receives the deregistration request from the UDM network element. The deregistration request includes the identification information of the first network slice and the identification information of the second network slice instance.

Optionally, after S1011 is performed, the first AMF network element performs step S1012.

S1012: The first AMF network element releases a session.

For example, the first AMF network element learns that the user equipment uses the second network slice instance, determines that the session established by the user equipment by using the first network slice instance before the movement cannot be maintained, and therefore releases the session established in the first network slice instance.

According to the method in this embodiment of the present invention, when there is no AMF network element, in a network, supporting the network slice instance requested by the user equipment, a core network may select a network slice instance supported by an AMF network element to serve the user equipment. In addition, the core network saves information about the network slice instance selected to serve the user equipment, so that after the user equipment moves next time, the core network can select the same network slice instance to serve the user equipment. In this way, it can be ensured that the session currently established by the user equipment is not interrupted after the next movement, thereby improving user experience. In addition, the core network may further notify an original AMF network element connected to the user equipment before the movement that the user equipment uses a different network slice instance after the movement. In this way, the original AMF network element releases the session, so that signaling processing load of the original AMF network element is reduced.

In the foregoing embodiments provided in this application, the solutions of the communication method provided in the embodiments of this application are separately described from perspectives of each network element and interaction between the network elements. It may be understood that, to implement the foregoing functions, each network element and device, for example, the radio access network device, the access and mobility management function network element, the user equipment, the data management function network element, and the network slice selection function network element, include a corresponding hardware structure and/or software module for performing each function. A person skilled in the art should easily be aware that, with reference to the units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation departs from the scope of this application.

Figure 11A:
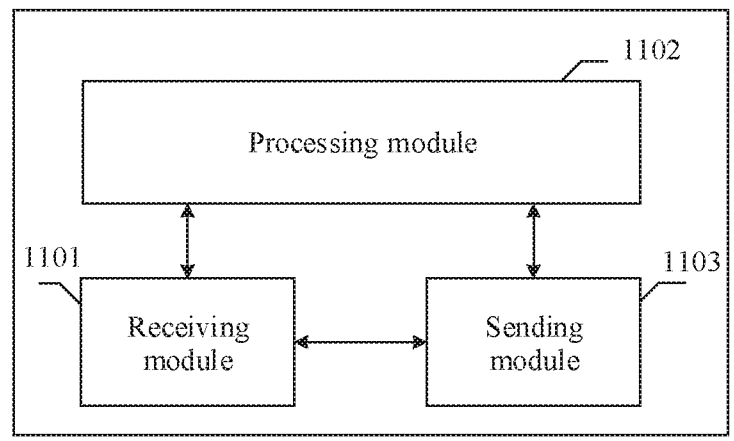
FIG. 11A and FIG. 11B are schematic structural diagrams of a network slicing-based apparatus/user equipment according to an embodiment of this application.

For example, when the foregoing network elements implement corresponding functions by using software modules, a network slicing-based communications apparatus may include a receiving module 1101, a processing module 1102, and a sending module 1103, as shown in FIG. 11A.

In an embodiment, the network slicing-based communications apparatus may be configured to perform operations of the radio access network device (for example, a RAN device) in FIG. 3 and FIG. 5. For example:

The receiving module 1101 is configured to receive a registration request from user equipment. The registration request includes first information and second information. The first information is used to indicate a type of the first network slice (for example, first S-NSSAI), and the second information is used to identify a first network slice instance in the first network slice (for example, a first NSI ID). The processing module 1102 is configured to determine an access and mobility management function network element based on the type of the first network slice and the first network slice instance. The sending module 1103 is configured to send a registration request to the access and mobility management function network element (for example, an AMF network element). The first information and the second information are used for determining a network slice instance.

In this way, in this embodiment of the present invention, the network slicing-based communications apparatus can select an access and mobility management function network element that supports the type of the first network slice and the first network slice instance to serve the user equipment. The access and mobility management function network element further determines, based on a requirement of the user equipment, a network slice instance that can serve the user equipment. When the user equipment moves, the user equipment may learn of a network slice instance that serves the user equipment before the movement. After the movement, the user equipment requests the same network slice instance from the core network, to ensure that a session established before the user equipment moves is not interrupted, thereby improving user experience.

Optionally, the receiving module 1101 is further configured to receive capability information from the access and mobility management function network element. The capability information is used to indicate a network slice type and a network slice instance that are supported by the access and mobility management function network element. That the processing module 1102 determines the access and mobility management function network element based on the type of the first network slice and the first network slice instance includes: determining, by the processing module 1102, the access and mobility management function network element based on the type of the first network slice, the first network slice instance, and the capability information.

Optionally, the access and mobility management function network element determined by the processing module 1102 supports the type of the first network slice and the first network slice instance.

In addition, the receiving module 1101, the processing module 1102, and the sending module 1103 in the network slicing-based communications apparatus may further implement other operations or functions of the radio access network device in the foregoing method. Details are not described herein again.

In another embodiment, the network slicing-based communications apparatus shown in FIG. 11A may be alternatively configured to perform operations of the first access and mobility management function network element (for example, the first AMF network element) in FIG. 3 and FIG. 4. For example:

A receiving module 1101 is configured to receive a registration request from a radio access network device (for example, a RAN device). The registration request includes first information and second information. The first information is used to indicate a type of a first network slice, and the second information is used to identify a first network slice instance in the first network slice. A processing module 1102 is configured to determine, based on the first information and the second information, a network slice instance that is in the first network slice and that serves user equipment.

In this way, by using the network slicing-based communications apparatus of a network slice in this embodiment of the present invention, a core network may determine, based on a requirement of the user equipment, a network slice instance that can serve the user equipment. When the user equipment moves, the user equipment may learn of a network slice instance that serves the user equipment before the movement. After the movement, the user equipment requests the same network slice instance from the core network, to ensure that a session established before the user equipment moves is not interrupted, thereby improving user experience.

Optionally, the network slicing-based communications apparatus further includes a sending module 1103, configured to send capability information to the radio access network device. The capability information is used to indicate the type of the first network slice and a network slice instance that is in the first network slice and that is supported by the network slicing-based communications apparatus. The capability information is used for determining the network slicing-based communications apparatus.

Optionally, the network slice instance that is in the first network slice and that serves the user equipment is the first network slice instance.

Optionally, that the processing module 1102 determines, based on the first information and the second information, the network slice instance that is in the first network slice and that serves the user equipment includes: when the network slicing-based communications apparatus does not support the first network slice instance identified by the second information, sending, by the sending module 1103, the first information and indication information to a network slice selection function network element (for example, an NSSF network element). The indication information is used to request to determine the network slice instance that is in the first network slice and that serves the user equipment. The receiving module 1101 receives, from the network slice selection function network element, identification information (for example, a second NSI ID) of a second network slice instance that is in the first network slice and that is supported by the network slicing-based communications apparatus.

Optionally, the sending module 1103 is further configured to send the identification information of the second network slice instance to the user equipment.

In addition, the receiving module 1101, the processing module 1102, and the sending module 1103 in the network slicing-based communications apparatus may further implement other operations or functions of the access and mobility management function network element in the foregoing method. Details are not described herein again.

In another embodiment, the apparatus shown in FIG. 11A may be alternatively configured to perform operations of the user equipment in FIG. 3, FIG. 4, FIG. 6, and FIG. 7. For example:

A receiving module 1101 is configured to obtain first information and second information. The first information is used to indicate a type of a first network slice, and the second information is used to identify a first network slice instance in the first network slice. A sending module 1103 is configured to send a registration request to a radio access network device. The registration request includes the first information and the second information, the first information and the second information are used for determining a first access and mobility management function network element, and the first information and the second information are further used for determining a network slice instance that is in the first network slice and that serves user equipment.

In this way, the user equipment in this embodiment of the present invention can obtain information about a network slice instance that the user equipment accesses before moving. After the user equipment moves, the user equipment may request, from a core network, the same network slice instance to serve the user equipment, to ensure that a session established before the user equipment moves is not interrupted, thereby improving user experience.

Optionally, that the receiving module 1101 obtains the first information and the second information includes: receiving, by the receiving module 1101, a registration accept message from a second access and mobility management function network element (for example, a second AMF network element), where the registration accept message includes the first information and the second information, and the second access and mobility management function network element supports the type of the first network slice and the first network slice instance; receiving, by the receiving module 1101, a session establishment accept message from a third access and mobility management function network element (for example, a third AMF network element), where the session establishment accept message includes the first information and the second information, and the third access and mobility management function network element supports the type of the first network slice and the first network slice instance; or receiving, by the receiving module 1101, the first information and the second information from an interworking network element, where the interworking network element supports a session management function of a first network and a session management function of a second network.

In addition, the receiving module 1101 and the sending module 1103 in the user equipment may further implement other operations or functions of the user equipment in the foregoing method. Details are not described herein again.

In another embodiment, the network slicing-based communications apparatus shown in FIG. 11A may be alternatively configured to perform operations of the second access and mobility management function network element (for example, the second AMF network element) in FIG. 8, FIG. 9, and FIG. 10A and FIG. 10B. For example:

A receiving module 1101 is configured to: after receiving a registration request, receive first information and second information from a data management function network element (for example, a UDM network element). The first information is used to indicate a type of a first network slice and the second information is used to identify a first network slice instance in the first network slice. When the network slicing-based communications apparatus based on the network slice does not support the first network slice instance identified by the second information, a sending module 1103 is configured to send the first information, the second information, and indication information to a network slice selection function network element (for example, an NSSF network element). The indication information is used to request to determine an access and mobility management function network element that supports the type of the first network slice and the first network slice instance.

In this way, by using the network slicing-based communications apparatus in this embodiment of the present invention, assuming that user equipment accesses the first network slice instance in the first network slice before moving, the user equipment stores the type of the first network slice and information about the first network slice instance in the data management function network element. After the user equipment moves, a first access and mobility management function network element requests the network slice selection function network element to select the second access and mobility management function network element that supports the first network slice type and the first network slice instance to serve the user equipment. Thereby, the second access and mobility management function network element can determine a network slice instance to serve the user equipment, to ensure that a session established before the user equipment moves is not interrupted, thereby improving user experience.

Optionally, the receiving module 1101 is further configured to receive identification information of the second network slice instance in the first network slice from the network slice selection function network element. The sending module 1103 is further configured to send the identification information of the second network slice instance to the data management function network element.

In addition, the receiving module 1101 and the sending module 1103 in the network slicing-based communications apparatus may further implement other operations or functions of the second access and mobility management function network element in the foregoing method. Details are not described herein again.

In another embodiment, the network slicing-based communications apparatus shown in FIG. 11A may be alternatively configured to perform operations of the data management function network element (for example, the UDM network element) in FIG. 8, FIG. 9, and FIG. 10A and FIG. 10B. For example:

A receiving module 1101 is configured to obtain first information and second information from a first access and mobility management function network element. The first information is used to indicate a type of a network slice, the second information is used to identify a network slice instance in the network slice, and the first access and mobility management function network element supports the type of the network slice and the network slice instance. A sending module 1103 is configured to send the first information and the second information to a second access and mobility management function network element. The first information and the second information are used for determining a third access and mobility management function network element, and the third access and mobility management function network element supports the type of the network slice and the network slice instance.

In this way, by using the network slicing-based communications apparatus in this embodiment of the present invention, before user equipment moves, a core network stores information about a network slice instance that serves the user equipment; and after the user equipment moves, the core network can select a network slice instance that is the same as that before the movement to serve the user equipment. In this way, it is ensured that a session established before the user equipment moves is not interrupted, thereby improving user experience. In addition, the data management function network element stores the information about the network slice instance that is before the movement, so that the user equipment and a RAN device do not learn of the information about the network slice instance, thereby saving storage space of the user equipment.

In addition, the receiving module 1101 and the sending module 1103 in the network slicing-based communications apparatus may further implement other operations or functions of the data management function network element in the foregoing method. Details are not described herein again.

In another embodiment, the network slicing-based communications apparatus shown in FIG. 11A may be alternatively configured to perform operations of the network slice selection function network element (for example, the NSSF network element) in FIG. 8, FIG. 9, and FIG. 10A and FIG. 10B. For example:

A receiving module 1101 is configured to receive first information, second information, and indication information from a first access and mobility management function network element. The first information is used to indicate a type of a first network slice, the second information is used to identify a first network slice instance in the first network slice, and the indication information is used to request to determine a second access and mobility management function network element that supports the type of the first network slice and the first network slice instance. A processing module 1102 is configured to determine whether the second access and mobility management function network element exists in an area in which user equipment is located.

In this way, by using the network slicing-based communications apparatus in this embodiment of the present invention, before moving, the user equipment stores, in the data management function network element, information about the type of the first network slice serving the user equipment and about the first network slice instance. After the user equipment moves, the network slice selection function network element receives the information about the type of the first network slice and about the first network slice instance from the first access and mobility management function network element. The network slice selection function network element determines whether the access and mobility management function network element supporting the type of the first network slice and the first network slice instance exists in the area in which the user equipment is located, to select an appropriate access and mobility management function network element to serve the user equipment.

Optionally, the network slicing-based communications apparatus further includes a sending module 1103. When the second access and mobility management function network element exists in the area in which the user equipment is located, the sending module 1103 is configured to send identification information of the second access and mobility management function network element to the first access and mobility management function network element.

Optionally, when the second access and mobility management function network element does not exist in the area in which the user equipment is located, the sending module 1103 is configured to send identification information of a second network slice instance in the first network slice to the first access and mobility management function network element.

In addition, the receiving module 1101, the processing module 1102, and the sending module 1103 in the network slicing-based communications apparatus may further implement other operations or functions of the network slice selection function network element in the foregoing method. Details are not described herein again.

In another embodiment, the network slicing-based communications apparatus shown in FIG. 11A may be alternatively configured to perform operations of the third access and mobility management function network element (for example, the third AMF network element) in FIG. 6 and operations of the first access and mobility management function network element (for example, the first AMF network element) in FIG. 8, and FIG. 10A and FIG. 10B. For example:

A receiving module 1101 is configured to obtain first information and second information. The first information is used to indicate a type of a first network slice, the second information is used to identify a first network slice instance in the first network slice, and the first access and mobility management function network element supports the type of the first network slice and the first network slice instance. A sending module 1103 is configured to send the first information and the second information to user equipment or a data management function network element. The first information and the second information are used for determining a second access and mobility management function network element. The second access and mobility management function network element supports the type of the first network slice and the network slice instance. The first information and the second information are further used for determining a network slice instance that is in the first network slice and that serves the user equipment.

Therefore, by using the network slicing-based communications apparatus in this embodiment of the present invention, before the user equipment moves, the user equipment or a core network may learn of a network slice instance that serves the user equipment. After the user equipment moves, the core network selects the same network slice instance that serves the user equipment before the movement, to ensure that a session established before the user equipment moves is not interrupted, thereby improving user experience.

Optionally, that the sending module 1103 sends the first information and the second information to the user equipment or the data management function network element includes: sending, by the sending module 1103, a registration accept message to the user equipment, where the registration accept message includes the first information and the second information; or sending, by the sending module 1103, a session establishment accept message to the user equipment, where the session establishment accept message includes the first information and the second information.

In addition, the receiving module 1101 and the sending module 1103 in the network slicing-based communications apparatus may further implement other operations or functions of the access and mobility management function network element in the foregoing method. Details are not described herein again.

In another embodiment, the network slicing-based communications apparatus shown in FIG. 11A may be alternatively configured to perform operations of the network slice selection function network element (for example, the NSSF network element) in FIG. 4. For example:

A receiving module 1101 is configured to receive first information and indication information from an access and mobility management function network element. The first information is used to indicate a type of a network slice, the indication information is used to request to determine a network slice instance that is in the network slice and that serves user equipment, and the access and mobility management function network element supports the type of the network slice and the network slice instance. A sending module 1103 is configured to send second information to the access and mobility management function network element, where the second information is used to identify a network slice instance in the network slice.

Therefore, by using the network slicing-based communications apparatus in this embodiment of the present invention, when there is no access and mobility management function network element that supports a type of a first network slice and a first network slice instance in the network, a core network may select the network slice instance supported by the access and mobility management function network element to serve the user equipment.

In addition, the receiving module 1101 and the sending module 1103 in the network slicing-based communications apparatus may further implement other operations or functions of the network slice selection function network element in the foregoing method. Details are not described herein again.

Figure 11B:
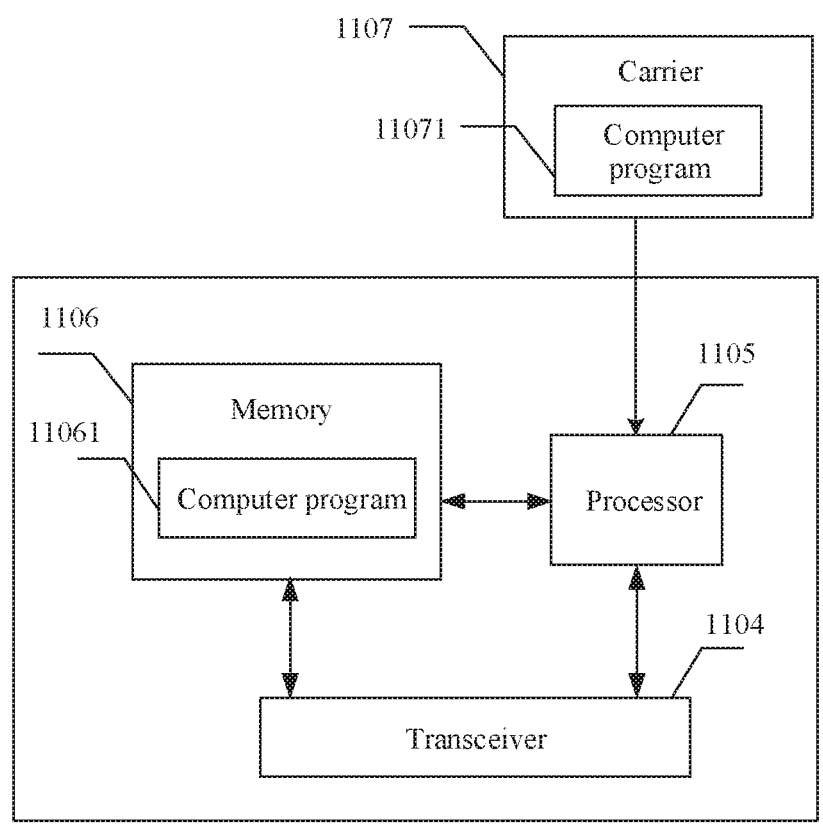

FIG. 11B is another possible schematic structural diagram of the network slicing-based communications apparatus/the user equipment in the foregoing embodiments. A network slicing-based communications apparatus/user equipment includes a transceiver 1104 and a processor 1105, as shown in FIG. 11B. For example, the processor 1105 may be a general-purpose microprocessor, a data processing circuit, an application-specific integrated circuit, or a field-programmable gate array (FPGA) circuit. The network slicing-based communications apparatus/the user equipment may further include a memory 1106. For example, the memory is a random access memory (RAM). The memory is configured to couple to the processor 1105, and stores a computer program 11061 necessary for the network slicing-based communications apparatus/the user equipment.

In addition, the network slicing-based communication method in the foregoing embodiments further provides a carrier 1107. The carrier stores a computer program 11071 of the network slicing-based communications apparatus/the user equipment, and the computer program 11071 may be loaded into the processor 1105. The carrier may be an optical signal, an electrical signal, an electromagnetic signal, or a computer-readable storage medium (for example, a hard disk).

When the computer program 11061 or 11071 runs on a computer (for example, runs on the processor 1105), the computer may be enabled to perform the foregoing method.

For example, in an embodiment, the processor 1105 is configured to implement another operation or function of a radio access network device. The transceiver 1104 is configured to implement communication between a network slicing-based communications apparatus and user equipment/an access and mobility management function network element.

In another embodiment, the processor 1105 is configured to implement another operation or function of an access and mobility management function network element. The transceiver 1104 is configured to implement communication between a network slicing-based communications apparatus and a radio access network device/a network slice selection function network element/user equipment.

In another embodiment, the processor 1105 is configured to implement another operation or function of user equipment. The transceiver 1104 is configured to implement communication between the user equipment and a radio access network device/a second access and mobility management function network element/a third access and mobility management function network element/an interworking network element.

In another embodiment, the processor 1105 is configured to perform another operation or function of a first access and mobility management function network element. The transceiver 1104 is configured to implement communication between a network slicing-based communications apparatus and a data management function network element/a network slice selection function network element.

In another embodiment, the processor 1105 is configured to implement another operation or function of a data management function network element. The transceiver 1104 is configured to implement communication between a network slicing-based communications apparatus and a first access and mobility management function network element/a second access and mobility management function network element.

In another embodiment, the processor 1105 is configured to implement another operation or function of a network slice selection function network element. The transceiver 1104 is configured to implement communication between a network slicing-based communications apparatus and a first access and mobility management function network element.

The controller/processor configured to implement the foregoing radio access network device in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various logical blocks, modules, and circuits in the examples described with reference to content disclosed in this application. Alternatively, the processor may be a combination of processors implementing a computing function, for example, a combination of one or more microprocessors, or a combination of a DSP and a microprocessor.

Method or algorithm steps described with reference to the content disclosed in this application may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a radio access network device. Certainly, the processor and the storage medium may alternatively exist in the radio access network device as discrete modules.

All or some of the foregoing embodiments may be implemented by using software, hardware, firmware, or any combination thereof. When software is used to implement an embodiment, the embodiment may be implemented all or partially in a form of a computer program product. The computer program product includes one or more computer instructions. When the computer program instructions are loaded and executed on a computer, the procedures or functions according to the embodiment of the present invention are all or partially generated. The computer may be a general-purpose computer, a special-purpose computer, a computer network, or another programmable apparatus. The computer instructions may be stored in a computer-readable storage medium or may be transferred from a computer-readable storage medium to another computer-readable storage medium. For example, the computer instructions may be transferred from a website, computer, server, or data center to another website, computer, server, or data center in a wired manner (for example, through a coaxial cable, an optical fiber, or a digital subscriber line (DSL)) or in a wireless manner (for example, by using infrared, radio, or microwave). The computer-readable storage medium may be any usable medium accessible to the computer, or a data storage device such as a server or a data center that integrates one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A network slicing-based communication method, comprising:
   receiving, by a radio access network device, a registration request from user equipment, wherein the registration request comprises first information and second information, wherein the first information is used to indicate a type of a first network slice, and wherein the second information is used to identify a first network slice instance in the first network slice;
   determining, by the radio access network device, an access and mobility management function network element based on the type of the first network slice and the first network slice instance; and sending, by the radio access network device, the registration request to the access and mobility management function network element, wherein the first information and the second information are used for network slice instance determining, wherein, in response to a determination that the access and mobility management function network element does not support the first network slice instance identified by the second information, the access and mobility management function network element is operable to send the first information and indication information to a network slice selection function network element, and wherein the indication information indicates a request to determine a network slice instance that is in the first network slice and that serves the user equipment.

2. The method according to claim 1, further comprising:
receiving, by the radio access network device, capability information from the access and mobility management function network element, wherein the capability information is used to indicate a network slice type and a network slice instance that are supported by the access and mobility management function network element; and
wherein the determining, by the radio access network device, an access and mobility management function network element based on the type of the first network slice and the first network slice instance comprises:
determining, by the radio access network device, the access and mobility management function network element based on the type of the first network slice, the first network slice instance, and the capability information.

3. The method according to claim 1, wherein the determined access and mobility management function network element supports the type of the first network slice and the first network slice instance.

4. The method according to claim 1, comprising:
determining, by the access and mobility management function network element based on the first information and the second information, a network slice instance that is in the first network slice and that serves the user equipment.

5. The method according to claim 4, further comprising:
sending, by the access and mobility management function network element, capability information to the radio access network device, wherein the capability information is used to indicate the type of the first network slice and a network slice instance that is in the first network slice and that is supported by the access and mobility management function network element, and wherein the capability information is used for determining the access and mobility management function network element.

6. The method according to claim 4, wherein the network slice instance that is in the first network slice and that serves the user equipment is the first network slice instance.

7. The method according to claim 4, wherein the determining, by the access and mobility management function network element based on the first information and the second information, a network slice instance that is in the first network slice and that serves user equipment comprises:
in response to determining that the access and mobility management function network element does not support the first network slice instance identified by the second information, sending, by the access and mobility management function network element, the first information and the indication information to the network slice selection function network element; and
receiving, by the access and mobility management function network element from the network slice selection function network element, identification information of a second network slice instance that is in the first network slice and that is supported by the access and mobility management function network element.

8. The method according to claim 7, further comprising:
sending, by the access and mobility management function network element, the identification information of the second network slice instance to the user equipment.

9. A network slicing-based communication method, comprising:
obtaining, by user equipment, first information and second information, wherein the first information is used to indicate a type of a first network slice, and wherein the second information is used to identify a first network slice instance in the first network slice;
sending, by the user equipment, a registration request to a radio access network device, wherein the registration request comprises the first information and the second information, wherein the first information and the second information are used for determining a first access and mobility management function network element, and wherein the first information and the second information are further used for determining a network slice instance that is in the first network slice and that serves the user equipment; and
in response to a determination that the first access and mobility management function network element does not support the first network slice instance identified by the second information, receiving, by the user equipment, identification information of a second network slice instance determined by a network slice selection function network element, wherein the second network slice instance is in the first network slice and is supported by the first access and mobility management function network element.

10. The method according to claim 9, wherein the obtaining, by user equipment, first information and second information comprises at least one of:
receiving, by the user equipment, a registration accept message from a second access and mobility management function network element, wherein the registration accept message comprises the first information and the second information, and wherein the second access and mobility management function network element supports the type of the first network slice and the first network slice instance;
receiving, by the user equipment, a session establishment accept message from a third access and mobility management function network element, wherein the session establishment accept message comprises the first information and the second information, and wherein the third access and mobility management function network element supports the type of the first network slice and the first network slice instance; or
receiving, by the user equipment, the first information and the second information from an interworking network element, wherein the interworking network element supports a session management function of a first network and a session management function of a second network.

11. User equipment, comprising:

at least one processor; and a memory coupled to the at least one processor and storing programming instructions for execution by the at least one processor, wherein the programming instructions instruct the at least one processor to perform operations comprising:
- obtaining first information and second information, wherein the first information is used to indicate a type of a first network slice, and wherein the second information is used to identify a first network slice instance in the first network slice;
- sending a registration request to a radio access network device, wherein the registration request comprises the first information and the second information, wherein the first information and the second information are used for determining a first access and mobility management function network element, and wherein the first information and the second information are further used for determining a network slice instance that is in the first network slice and that serves the user equipment; and
- in response to a determination that the first access and mobility management function network element does not support the first network slice instance identified by the second information, receiving identification information of a second network slice instance determined by a network slice selection function network element, wherein the second network slice instance is in the first network slice and is supported by the first access and mobility management function network element.

12. The user equipment according to claim 11, wherein obtaining the first information and the second information comprises at least one of:
- receiving a registration accept message from a second access and mobility management function network element, wherein the registration accept message comprises the first information and the second information, and wherein the second access and mobility management function network element supports the type of the first network slice and the first network slice instance;
- receiving a session establishment accept message from a third access and mobility management function network element, wherein the session establishment accept message comprises the first information and the second information, and wherein the third access and mobility management function network element supports the type of the first network slice and the first network slice instance; or
- receiving the first information and the second information from an interworking network element, wherein the interworking network element supports a session management function of a first network and a session management function of a second network.

13. The network slicing-based communication method according to claim 1, wherein the first network slice comprises a plurality of network slice instances.

14. The network slicing-based communication method according to claim 1, wherein the second information comprises an identifier of the first network slice instance.

* * * * *